United States Patent
Ajito

(10) Patent No.: US 7,554,692 B2
(45) Date of Patent: Jun. 30, 2009

(54) CORRECTION DATA ACQUISITION METHOD AND CALIBRATION SYSTEM FOR IMAGE DISPLAY DEVICE

(75) Inventor: Takeyuki Ajito, Tokyo (JP)

(73) Assignee: Olympus Corporation, Tokyo (JP)

( * ) Notice: Subject to any disclaimer, the term of this patent is extended or adjusted under 35 U.S.C. 154(b) by 596 days.

(21) Appl. No.: 10/561,630

(22) PCT Filed: Jun. 23, 2004

(86) PCT No.: PCT/JP2004/008800

§ 371 (c)(1),
(2), (4) Date: Dec. 20, 2005

(87) PCT Pub. No.: WO2005/002239

PCT Pub. Date: Jan. 6, 2005

(65) Prior Publication Data

US 2007/0097213 A1    May 3, 2007

(30) Foreign Application Priority Data

Jun. 27, 2003    (JP)    ............... 2003-185165

(51) Int. Cl.
*G06F 15/00*    (2006.01)
(52) U.S. Cl. .................. 358/1.9; 358/504; 348/383
(58) Field of Classification Search .................. 358/1.9, 358/504; 348/383
See application file for complete search history.

(56) References Cited

U.S. PATENT DOCUMENTS 6,219,099 B1 *    4/2001    Johnson et al. ............. 348/383
6,340,976 B1 *    1/2002    Oguchi et al. ............... 345/690
6,618,076 B1 *    9/2003    Sukthankar et al. ......... 348/180

FOREIGN PATENT DOCUMENTS

| JP | 2002-072359 | 3/2002 |
|---|---|---|
| JP | 2002-116500 | 4/2002 |
| JP | 2003-50572 | 2/2003 |

* cited by examiner

*Primary Examiner*—Twyler L. Haskins
*Assistant Examiner*—Michael Burleson
(74) *Attorney, Agent, or Firm*—Volpe and Koenig, P.C.

(57) ABSTRACT

A correction data acquisition method for an image display device, which is used to display a predetermined image using a plurality of primary colors. An offset image at a black level is displayed at an image display section of the image display device. A multiband offset captured data is acquired by capturing the offset image through filters corresponding to primary colors. Primary color images at predetermined signal levels of the corresponding primary colors are displayed sequentially. A multiband primary color captured data is acquired by capturing the primary color images through the filters for the corresponding primary colors. Primary color scale images are displayed by varying input signal levels of the corresponding primary colors sequentially. Primary color scale captured data is acquired by capturing the primary color scale images sequentially. Calculation is made of the offset correction data on the multiband offset captured data, the multiband primary color captured data and the primary color scale captured data, so as to acquire correction data relating to color shading in the image display device.

15 Claims, 21 Drawing Sheets

CORRECTION DATA ACQUISITION METHOD AND CALIBRATION SYSTEM FOR IMAGE DISPLAY DEVICE

TECHNICAL FIELD

The present invention relates to a correction data acquisition method and a calibration system for an image display device.

BACKGROUND ART

An image display device in the form of a multi-projector system is known, wherein a plurality of images are projected from corresponding projectors, and synthesized and displayed on a screen. In such a multi-projector system, for example, it is necessary to ensure that seams between the projected images are made as less noticeable as possible.

Thus, the applicant has proposed an image display device wherein a calibration image is projected onto a screen, the projected image is captured by a capturing means, such as a digital camera or the like, and various calibrations are performed based on the captured data. An image display device of this type is disclosed, e.g., in Japanese Patent Application Laid-open Publication Nos. 2002-72359 and 2002-116500.

With a normal projector, a black level image is generated by an offset light, in which the signal levels are zero for the primary colors red (R), green (G) and blue (B). Such black level image is unstable in luminance within the image and tends to cause color shading of the image, so that calibration of the black level image (offset calibration) is necessary.

With the image display device disclosed in the above-mentioned Japanese Patent Application Laid-open Publication No. 2002-72359 or No. 2002-116500, however, the calibration image is captured without separation of the primary colors R, G and B. As such, it is difficult accurately to detect the color components of the black level image. Therefore, when a dark image is displayed, there tends to occur color shading of the image both within an image projected from a projector (intra-image shading), and between images projected from adjacent projectors (inter-image shading), thereby degrading the quality of the displayed image.

In order to correct color shading in the offset lights projected from the projectors, the applicant has already proposed a multi-projector system wherein a calibration camera is equipped with filters each corresponding to a primary color of the projector, so as to detect a luminance distribution of each primary color in the offset light, and to thereby acquire an offset correction data for correcting the color shading of the offset lights based on the luminance distribution. A multi-projector system of this type is disclosed, e.g., in Japanese Patent Application Laid-open Publication No. 2002-160475.

According to extensive experimental studies conducted by the applicant, it has been confirmed that the color shading of the projected images and the seams between the adjacent projectors can be mitigated. On the other hand, it has been also revealed that further improvement could be made with respect to the following points.

That is to say, with the above-mentioned multi-projector system, in order to detect the luminance distribution of each primary color of the offset light, the calibration camera is equipped with filters for the respective primary colors, which are narrow band range filters that do not allow transmission of the other primary colors. In this instance, not only the manufacture of the filters becomes difficult and the manufacturing cost of the filter increases, but also the light intensity upon capturing of the calibration image by the calibration camera becomes extremely low, requiring a prolonged exposure time for capturing the calibration image.

Moreover, when the projector is replaced and the spectrum characteristic of each primary color is thereby changed, the light of the primary colors projected from the current projector cannot be separated with the filters which had been effectively used for the previous projector, resulting in degradation in the correction accuracy of the color shading. As a countermeasure for such a problem, one may consider that the filter could be changed corresponding to the spectrum characteristic of the primary colors of the projector. To this end, however, a large number of filters with different band ranges must be prepared, thereby further increasing the manufacturing cost. Moreover, even if the filters are changed, there is no change in the basic situation where narrow band range filters are used, so that the problem of the prolonged exposure time for capturing the calibration image still remains unsolved.

The above-mentioned problems occur also when the color shading due to the offset light is to be corrected, in an image display device that is provided with a single projector, a CRT display, a liquid crystal display, or an LED display.

It is therefore an object of the present invention to provide a method for acquiring a correction data in an image display device, wherein the exposure time required for calibration can be shortened, and the change in spectrum characteristic of each primary color in the image display device can be effectively compensated so that the color shading of the image can be corrected highly precisely, without increase in the manufacturing cost.

It is another object of the present invention to provide a calibration system for such an image display device, wherein the method for acquiring a correction data can be carried out with a simple structural measure.

DISCLOSURE OF THE INVENTION

In order to achieve these objects, a first aspect of the invention as defined by claim 1 provides a correction data acquisition method for an image display device wherein an image is displayed with a plurality of primary colors, comprising the steps of:

displaying an offset image with a black signal level at an image display section in said image display device;

capturing said offset image by successively switching filters having bands corresponding to said plurality of primary colors, respectively, so as to acquire a multiband offset captured data;

sequentially displaying primary color images at said image display section, said primary color images having predetermined signal levels for the corresponding primary colors;

sequentially capturing said primary color images while switching said filters for the corresponding primary colors, so as to acquire multiband primary color captured data;

displaying primary color scale images at said image display section, said primary color scale images having an input signal level that is gradually changed for each of the corresponding primary colors;

sequentially capturing said primary color scale images so as to acquire a primary color scale captured data; and calculating an offset correction data based on said multiband offset captured data, said multiband primary color captured data, and said primary color scale captured data.

With the method of claim 1, since the offset correction data are calculated based on the multiband offset captured data, the multiband primary color captured data, and the primary color scale captured data, which are acquired for the corresponding primary colors at the image display section, it is possible to enlarge the transmittance wavelength-band ranges of the filters for the corresponding primary colors. Therefore, it is possible to shorten the exposure time required for calibration without increase in cost, and compensate for changes in spectral characteristic of the corresponding primary colors at the image display device, thereby precisely correcting the color shading of the image display device.

A second aspect of the invention as defined by claim 2 provides a correction data acquisition method for an image display device wherein an image is displayed with a plurality of primary colors, comprising the steps of:

displaying an offset image with a black level at an image display section in said image display device;

capturing said offset image simultaneously through filters for the corresponding primary colors, so as to acquire a multiband offset captured data;

sequentially displaying primary color images at said image display section, said primary color images having signal levels of the corresponding primary colors;

capturing said primary color images simultaneously through said filters for the corresponding primary colors, so as to acquire a multiband primary color captured data;

sequentially displaying gray scale images in said image display section, said gray scale images having gray scale signal levels;

simultaneously capturing said gray scale images through said filters for the corresponding primary colors, so as to acquire primary color scale captured data; and calculating an offset correction data based on said multiband offset captured data, said multiband primary color captured data, and said primary color scale captured data.

With the method of claim 2, it is possible to perform essentially the same function/effect as the method of claim 1. Also, the multiband offset captured data, the multiband primary color captured data, and the primary color scale captured data can be acquired easily with a less expensive digital camera. Moreover, the primary color scale captured data can be acquired for the entire primary colors by capturing the gray scale images, without using all of the primary colors. Thus, the number of capturing operation required for the calibration can be significantly reduced, thereby shortening the calibration time.

A third aspect of the invention as defined by claim 3 provides a method of claim 1 or 2, wherein, upon capturing for acquisition of said multiband offset captured data, said multiband primary color captured data and said primary color scale captured data, capturing of lights within a wavelength range above 650-780 nm is cut off.

With the method of claim 3, upon the image capturing for calibration, undesired capturing of near-infrared ranged lights can be cut off, so as to enhance the correction accuracy of color shading.

A fourth aspect of the invention as defined by claim 4 provides a method of any one of claims 1-3, wherein, upon capturing for acquisition of said multiband offset captured data, said multiband primary color captured data and said primary color scale captured data, capturing of lights within a wavelength range below 400 nm is cut off.

With the method of claim 4, upon the image capturing in calibration, the undesired capturing of near-ultraviolet ranged lights can be cut off, so as to enhance the correction accuracy of color shading.

A fifth aspect of the invention as defined by claim 5 provides a method of any one of claims 1-4, wherein the number of the primary colors is not less than three.

With the method of claim 5, it is possible to reproduce a color of the image with high fidelity. In particular, when the number of the primary colors is four or more, it is possible to display the color of the image with high chromaticity, which could not be displayed with the normal three primary colors RGB, so that the color reproduction of the image can be performed with even higher fidelity. Moreover, the correction of the color shading enables the color reproduction of an image as a whole with a further enhanced fidelity.

A sixth aspect of the invention as defined by claim 6 provides a method of any one of claims 1-5, wherein the image display section includes a plurality of projectors for projecting and displaying one image.

With the method of claim 6, it is possible to display an intended image with high luminance and high definition, besides that a correction of the color shading makes the seams between the images from the projectors to be less noticeable.

A seventh aspect of the invention as defined by claim 7 provides a method of any one of claims 1-6, wherein said filters are designed so as to allow transmission of a luminescence band ranges of a corresponding primary color and transmission of at least part of luminescence band ranges of the other primary colors.

With the method of claim 7, the filter for each band can be realized as less expensive filters with a wide transmittance wavelength-band range, so as to reduce the total cost of the image display device as a whole. Also, the exposure time required for calibration can be shortened and the captured data with a high S/N ratio can be acquired, so that the color shading can be corrected more precisely.

An eighth aspect of the invention as defined by claim 8 provides a method of claim 1, wherein a tunable filter is used as said filters, said tunable filter being electrically controllable so as to allow transmission of a luminescence band range of a corresponding primary color and transmission of at least part of luminescence band ranges of the other primary colors.

With the method of claim 8, a single tunable filter can be used as the filters for each band with a wide transmittance wavelength-band range, so as to ensure downsizing of the camera for calibration and simplification of the filtering control.

In order to achieve the above-mentioned further object, a ninth aspect of the invention defined by claim 9 provides a calibration system for an image display device including an image display section for displaying an image with a plurality of primary colors, comprising:

a calibration pattern generating section for selectively displaying, at said image display section, calibration patterns of an offset image at a black level, of primary color images at predetermined signal levels of the corresponding primary colors, and of the corresponding primary colors acquired by sequentially changing input signal levels of the corresponding primary colors;

an image capturing section which includes filters having bands for the corresponding primary colors and a through-hole, said filters being designed for allowing transmission of a luminescence band ranges of a corresponding primary color and transmission of at least part of luminescence band ranges of the other primary colors, said image capturing section being for capturing said calibration patterns displayed at said image display section, while selecting said filters or said through-hole; and an image correction data calculating section for calculating offset correction data based on multiband offset captured data acquired by sequentially capturing said offset image with said image capturing section while switching said filters for the corresponding primary colors, multiband primary color captured data acquired by sequentially capturing said primary color images with said image capturing section while switching said filters for the corresponding primary colors, and primary color scale captured data acquired by sequentially capturing said primary color scale images with said image capturing section through said through-hole.

The calibration system of claim 9 is featured by the provision of the image capturing section, wherein the filters for the corresponding primary colors are designed for allowing transmission of a luminescence band ranges of a corresponding primary color and transmission of at least part of luminescence band ranges of the other primary colors, and by the provision of the image correction data calculating section, wherein the offset correction data are calculated based on multiband the offset captured data acquired by sequentially capturing the offset image with the image capturing section while switching the filters for the corresponding primary colors, multiband primary color captured data acquired by sequentially capturing the primary color images with the image capturing section while switching the filters for the corresponding primary colors, and primary color scale captured data acquired by sequentially capturing the primary color scale images with the image capturing section through the through-hole. It is therefore possible to perform the correction data acquiring method as defined by any one of claim 1 and its dependent claims, with the simple and less expensive calibration system.

A tenth aspect of the invention as defined by claim 10 provides a calibration system for an image display device including an image display section for displaying an image with a plurality of primary colors, comprising:

a calibration pattern generating section for selectively displaying, at said image display section, calibration patterns of an offset image at a black level, of primary color images at predetermined signal levels of the corresponding primary colors, and of gray scale images acquired by sequentially changing input signal levels of the corresponding primary colors;

an image capturing section which includes filters having bands for the corresponding primary colors and a through-hole, said filters being designed for allowing transmission of a luminescence band ranges of a corresponding primary color and transmission of at least part of luminescence band ranges of the other primary colors, said image capturing section being for simultaneously capturing said calibration patterns displayed at said image display section, through said filters; and an image correction data calculating section for calculating an offset correction data based on multiband offset captured data acquired by capturing said offset image with said image capturing section, multiband primary color captured data acquired by capturing said primary color images, and primary color scale captured data acquired by capturing said primary color scale images.

The calibration system of claim 10 is featured by the provision of the image capturing section, wherein the filters having bands for the corresponding primary colors are designed for allowing transmission of a luminescence band ranges of a corresponding primary color and transmission of at least part of luminescence band ranges of the other primary colors, and by the provision of the image correction data calculating section, wherein the offset correction data are calculated based on the multiband offset captured data acquired by capturing the offset image, the multiband primary color captured data acquired by capturing the primary color images, and the gray color scale captured data acquired by capturing the primary color scale images. It is therefore possible to perform the correction data acquiring method as defined by any one of claim 2 and its dependent claims, with the simple and less expensive calibration system.

BEST MODE FOR CARRYING OUT THE INVENTION

The present invention will now be described hereinafter with reference to preferred embodiments shown in the accompanying drawings.

First Embodiment

Figure 1:
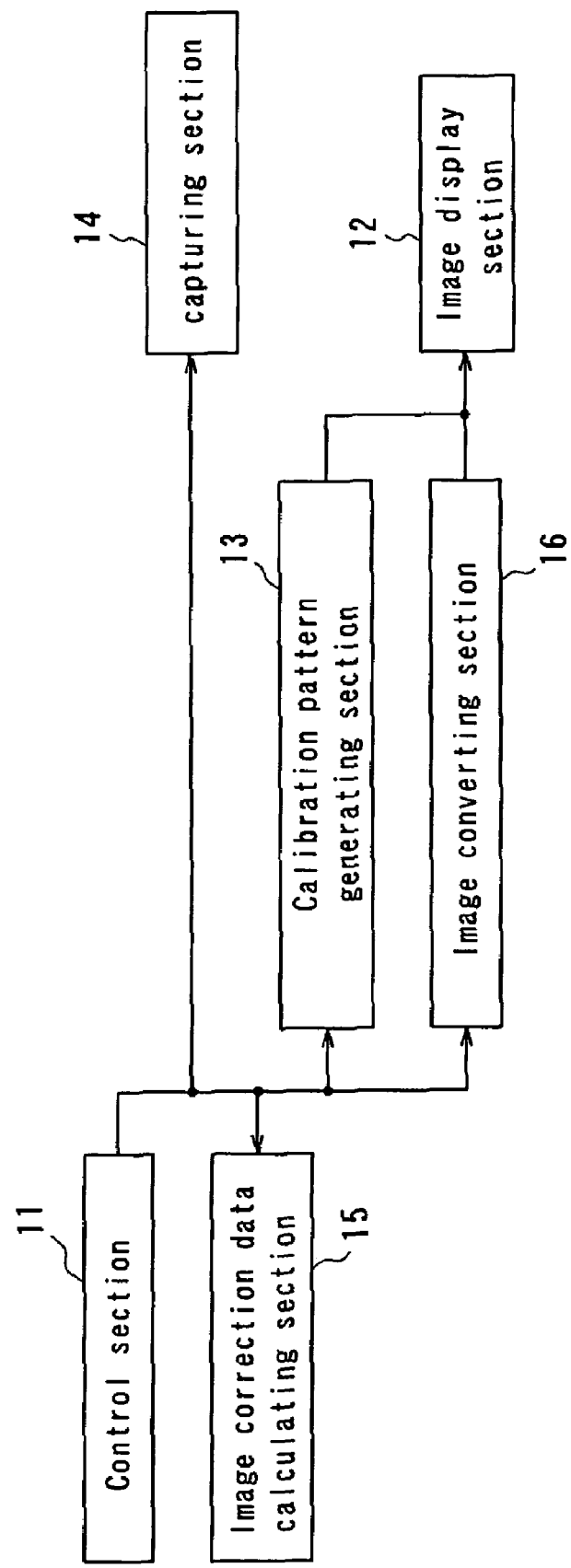
FIG. 1 is a block diagram showing a basic structure of a calibration system for an image display device according to a first embodiment of the present invention.

FIG. 1 is a block diagram showing functional features of the calibration system for an image display device according to a first embodiment of the present invention. The image display device constitutes a multi-projector system wherein images projected from a plurality of projectors are synthesized into one image on a screen. The image display device according to the present embodiment is similar in basic constitution to a conventional multi-projector system, and includes a control section 11 for controlling the entire system, an image display section 12 for projecting an image on the screen, a calibration pattern generating section 13 for generating a calibration pattern (calibration image), an image capturing section 14 for capturing the calibration pattern projected on the screen, an image correction data calculating section 15 for calculating various image correction data based on the captured calibration pattern, and an image converting section 16 for generating an output image through correction of an input image data using the calculated image correction data.

Figure 2:
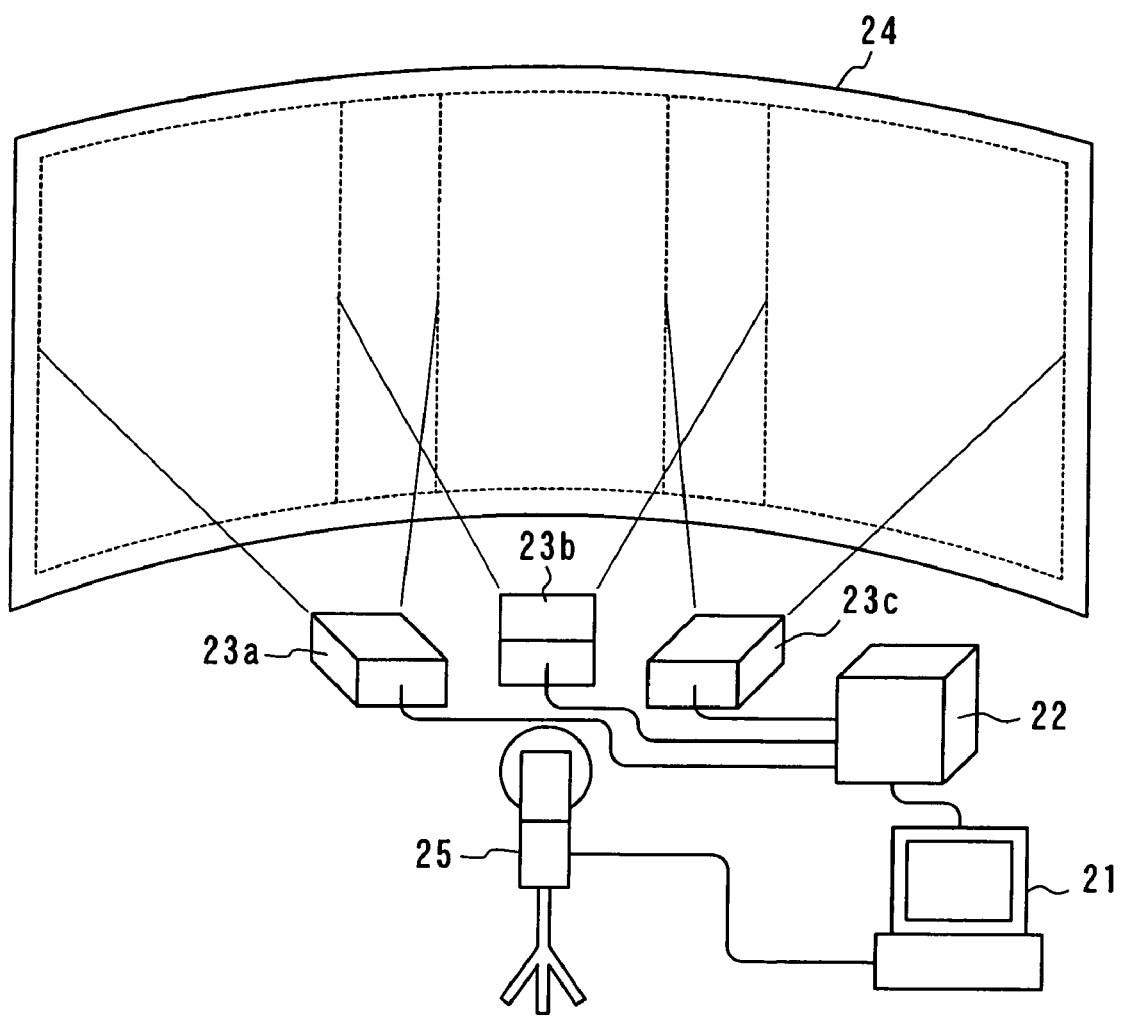
FIG. 2 is an explanatory view showing the concrete structure thereof.

FIG. 2 is an explanatory view of the concrete structure of a calibration system according to the first embodiment. A personal computer (PC) 21 includes the control section 11, the calibration pattern generating section 12, and the image correction data calculating section 15, which are depicted in FIG. 1. The personal computer 21 serves not only to controls the entire system, but also generate various calibration patterns and conduct various calculations. The personal computer 21 is connected to the image converting section 16 and an auxiliary device containing part of the image display section 12, which are depicted in FIG. 1.

The image display section 12 depicted in FIG. 1 includes projectors 23a, 23b and 23c for projecting color images using respective primary colors RGB. The images from the respective projectors 23a, 23b and 23c are synthesized into an image on an arch-shaped screen 24, through overlapping of the images along the seams between the adjacent images. In addition to normal images using the primary colors, the projectors 23a, 23b and 23c also serve to project calibration patterns, respectively, on the screen 24 in calibration of the primary colors. Although the first embodiment employs three projectors, there is no particular limitation in the number and arrangement of the projectors.

A calibration camera 25 corresponds to the image capturing section 14 depicted in FIG. 1, and serves to capture the calibration patterns which are projected from the projectors 23a, 23b and 23c onto the screen 24. The captured data are transferred from the calibration camera 25 to the personal computer 21, in order to calculate various image correction data.

Figure 3:
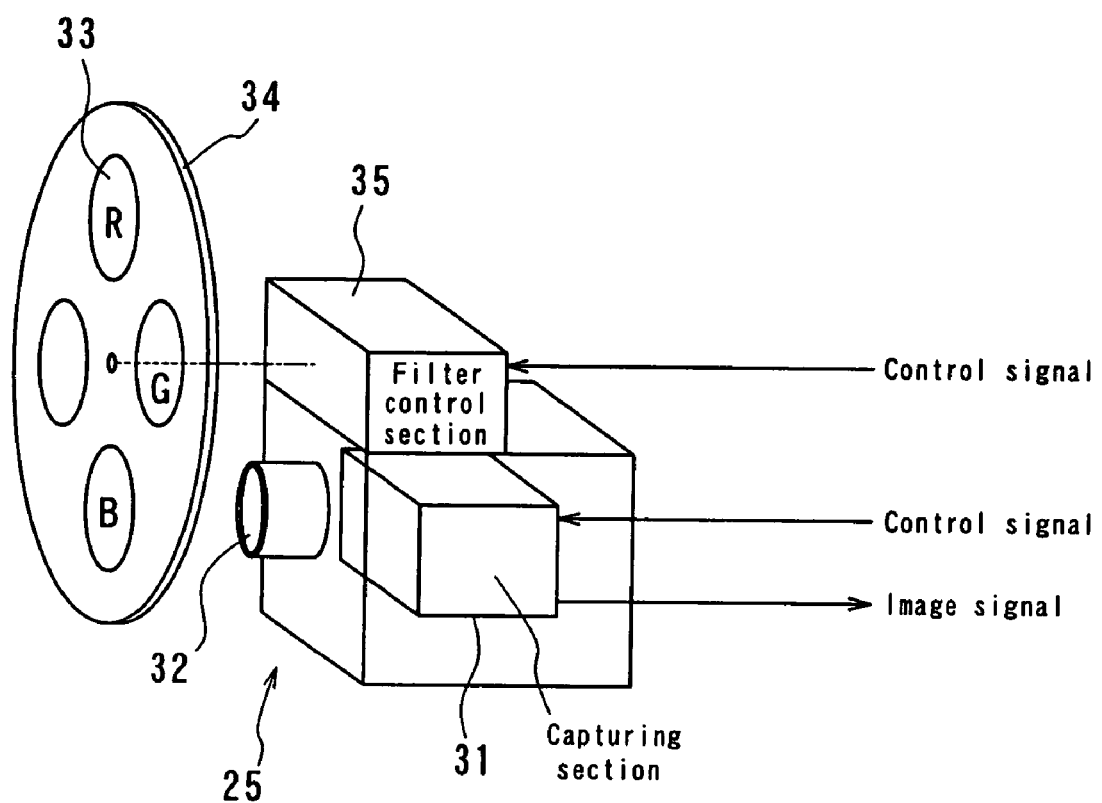
FIG. 3 is a schematic view showing one example of the structure of the calibration camera depicted in FIG. 2.

FIG. 3 is a schematic view showing a concrete structure of the calibration camera 25 depicted in FIG. 2. The calibration camera 25 includes a capturing section 31 made of CCD or the like, a capturing lens 32 for focusing an image to be captured by the capturing section 31, a filter turret 34 having a plurality of filters 33 with respectively predetermined filtering characteristics, and a filter control section 35 for positioning the desired filter 33 in front of the capturing lens 32, through an angular control of the filer turret 34 based on the control signal from the personal computer 21 depicted in FIG. 2.

In the first embodiment, the filter turret 34 is provided with at least three band filters 33, each corresponding to a primary color R, G or B, and also with a filter-less through-hole for allowing that the light (image) to be captured is directly incident on the capturing lens 32.

Figure 4:
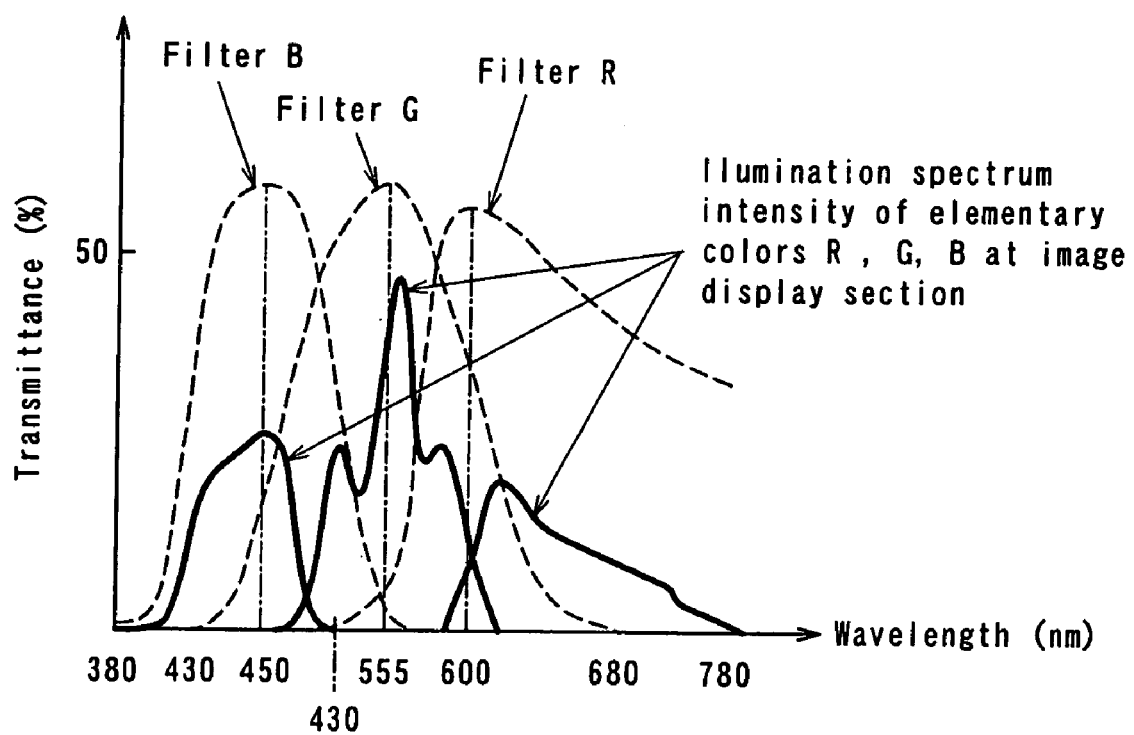
FIG. 4 is a graph showing the spectral transmittance characteristics of the three band filters depicted in FIG. 3.

As shown in FIG. 4, each filter has a spectrum transmittance characteristic that allows transmission of the illumination spectrum of the corresponding primary color at the image display section 12, and also transmission of at least part of the illumination spectrum of the other primary colors.

Figure 5:
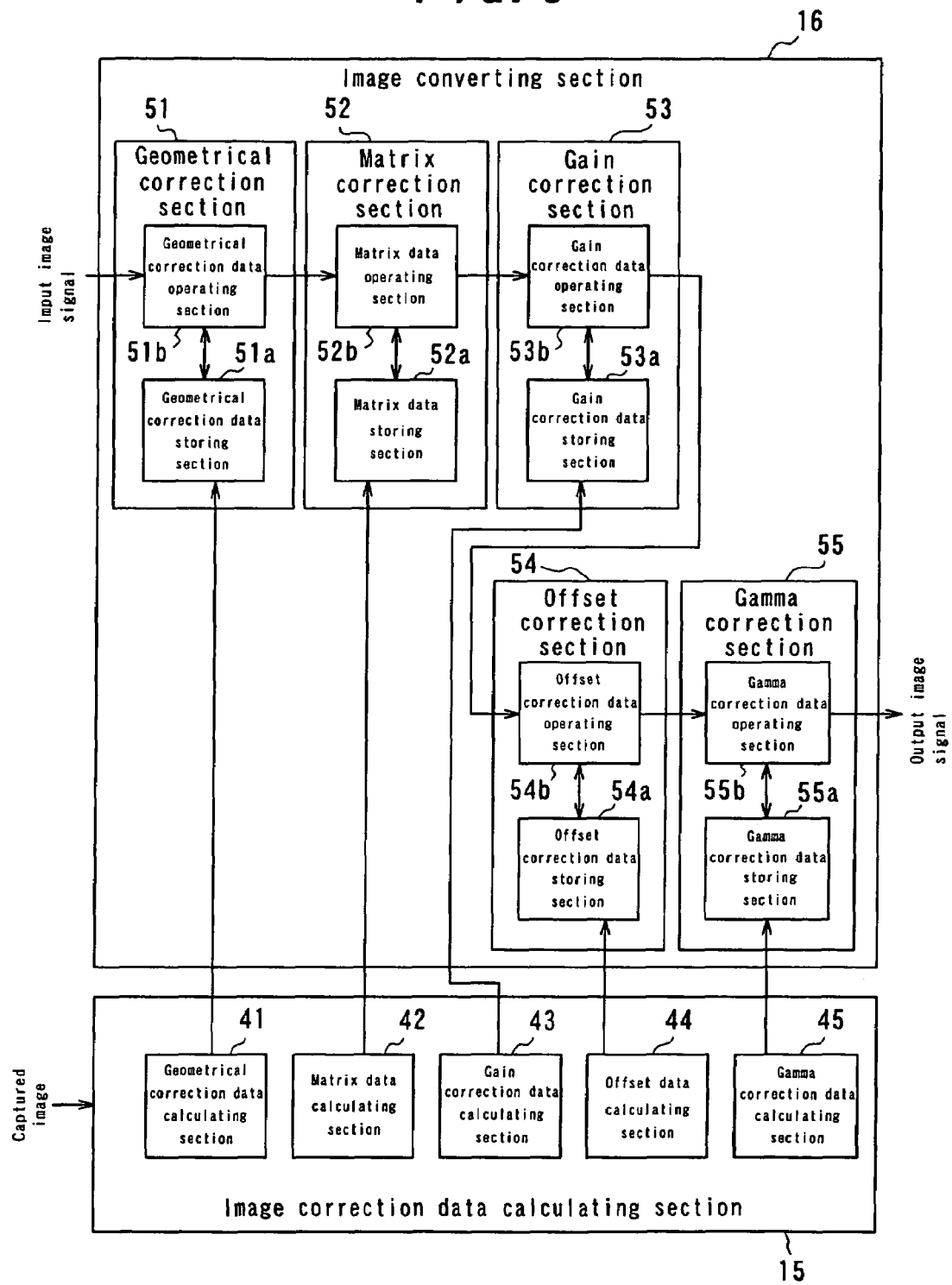
FIG. 5 is a block diagram showing the structure of the image correction data calculating section and the image converting section depicted in FIG. 1.

FIG. 5 is a block diagram showing the concrete structure of the image correction data calculating section 15 and the image converting section 16, which are depicted in FIG. 1. The image correction data calculating section 15 includes a geometrical correction data calculating section 41 that calculates the data for correcting the relative position between the adjacent images from the corresponding projectors in the image display section 12, a matrix data calculating section 42 that calculates the data for correcting the color of the images from the projectors, a gain correction data calculating section 43 that calculates the data for correcting the gain (luminance) of the images from the projectors, an offset correction data calculating section 44 that calculates the data for correcting the black levels (offset levels) of the images from the projectors, and a gamma correction data calculating section 45 that calculates the data for correcting the gamma characteristics of the images from the projectors. The image correction data calculating section 15 conducts the calculations of each correction data as mentioned above, based on the captured data of the images captured by the image capturing section 14 (calibration camera 25).

The image converting section 16 includes a geometrical correction section 51, a matrix correction section 52, a gain correction section 53, an offset correction section 54, and a gamma correction section 55, and conducts each correction with reference to the input image data (input image signal) based on the correction data from the image correction data calculating section 15, and outputs the resultant corrected image data as the output image data (output image signal).

In other words, after the correction data have been calculated at the geometrical correction data calculating section 41, the matrix data calculating section 42, the gain correction data calculating section 43, the offset correction data calculating section 44, and the gamma correction data calculating section 45, these calculated data are transferred to a geometrical correction data storing section 51a, a matrix data storing section 52a, a gain correction data storing section 53a, an offset correction data storing section 54a and a gamma correction data storing section 55a, respectively. The data stored in these correction data storing sections are used to conduct corrections with reference to the input data, at a geometrical correction data operating section 51b, a matrix data operating section 52*b*, a gain correction data operating section 53*b*, an offset correction data operating section 54*b* and a gamma correction data operating section 55*b*, respectively.

Figure 6:
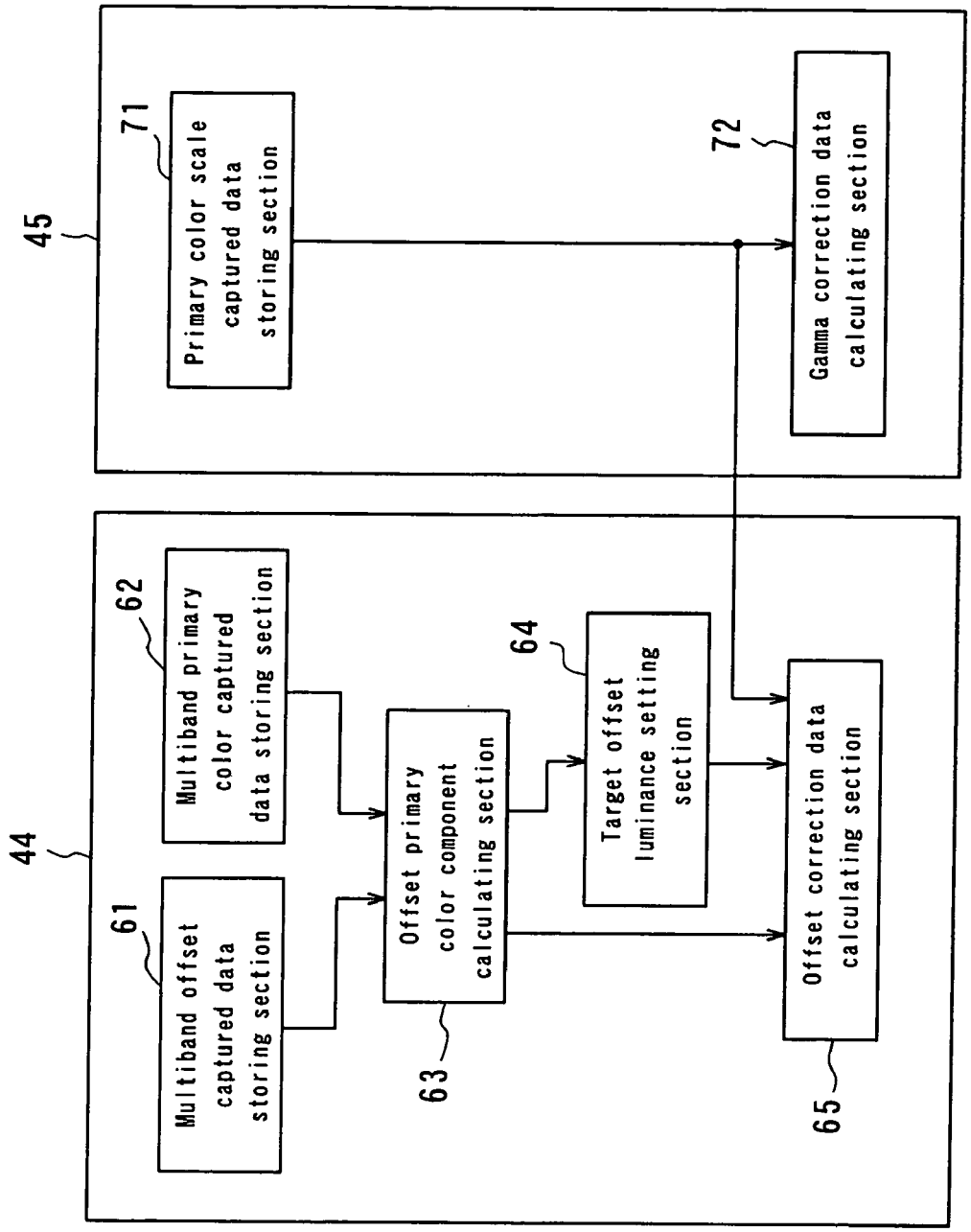
FIG. 6 is a block diagram showing the detailed structure of the offset correction data calculating section and the gamma correction data calculating section depicted in FIG. 5.

FIG. 6 is a block diagram showing the detailed structure of the offset correction data calculating section 44 and the gamma correction data calculating section 45, in the image correction data calculating section 15 depicted in FIG. 5.

The offset correction data calculating section 44 includes a multiband offset captured data storing section 61, a multiband primary color captured data storing section 62, an offset primary color component calculating section 63, a target offset luminance setting section 64, and an offset correction data calculating section 65.

The multiband offset captured data storing section 61 serves to store offset data captured data acquired by capturing offset images through the respective filters for the primary colors RGB, which offset images are displayed when image data for the calibration patterns with RGB input signals of zero levels (black levels) are transferred to the image display section 12. The multiband primary color captured data storing section 62 serves to store primary color captured data acquired by capturing primary color images through the respective filters for the primary colors RGB, which primary color captured data are displayed when image data for the calibration patterns with the corresponding primary colors R, G, B of the maximum levels are transferred to the image display section 12.

The offset primary color component calculating section 63 serves to calculate the primary color components of the offset image based on the offset captured data of each primary color RGB stored in the multiband offset captured data storing section 61, and the captured data at the maximum signal levels of the primary colors RGB stored in the multiband primary color captured data storing section 62. The calculated primary color components of the offset image are supplied to the target offset luminance setting section 64 and the offset correction data calculating section 65.

The target offset luminance setting section 64 serves to set the target offset luminance of the primary colors based on the primary color components of the offset image calculated at the offset primary color component calculating section 63. The target offset luminance of the primary colors are supplied to the offset correction data calculating section 65.

The offset correction date calculating section 65 serves to calculate the offset correction data for the primary colors of the projectors constituting the image display section 12, based on the primary color components of the offset image calculated at the offset primary color component calculating section 63, the target offset luminance of the primary colors set at the target offset luminance setting section 64, and the primary color scale captured data stored in an primary color scale captured data storing section 71 to be explained hereinafter, which is included in the gamma correction data calculating section 45. The calculated offset correction data are supplied to, and stored in the offset correction data storing section 54*a* in the offset correction section 54 depicted in FIG. 5.

The gamma correction data calculating section 45 includes the above-mentioned primary color scale captured data storing section 71, and a gamma correction data calculating section 72. The primary color scale captured data storing section 71 serves to store primary color scale captured data acquired by capturing, without using the filters for the primary colors, the color scale images of the primary colors displayed on the display section 12 when the image data with the calibration patterns acquired by appropriately changing the input signal levels of the primary colors from zero level (minimum level) to the maximum level, respectively, are transferred. The gamma correction data calculating section 72 serves to calculate gamma correction data for the primary colors of the projectors constituting the image display section 12, based on the primary color scale captured data stored in the primary color scale captured data storing section 71. The calculated gamma correction data are supplied to, and stored in the gamma correction data storing section 55*a* in the gamma correction section 55.

Figure 7:
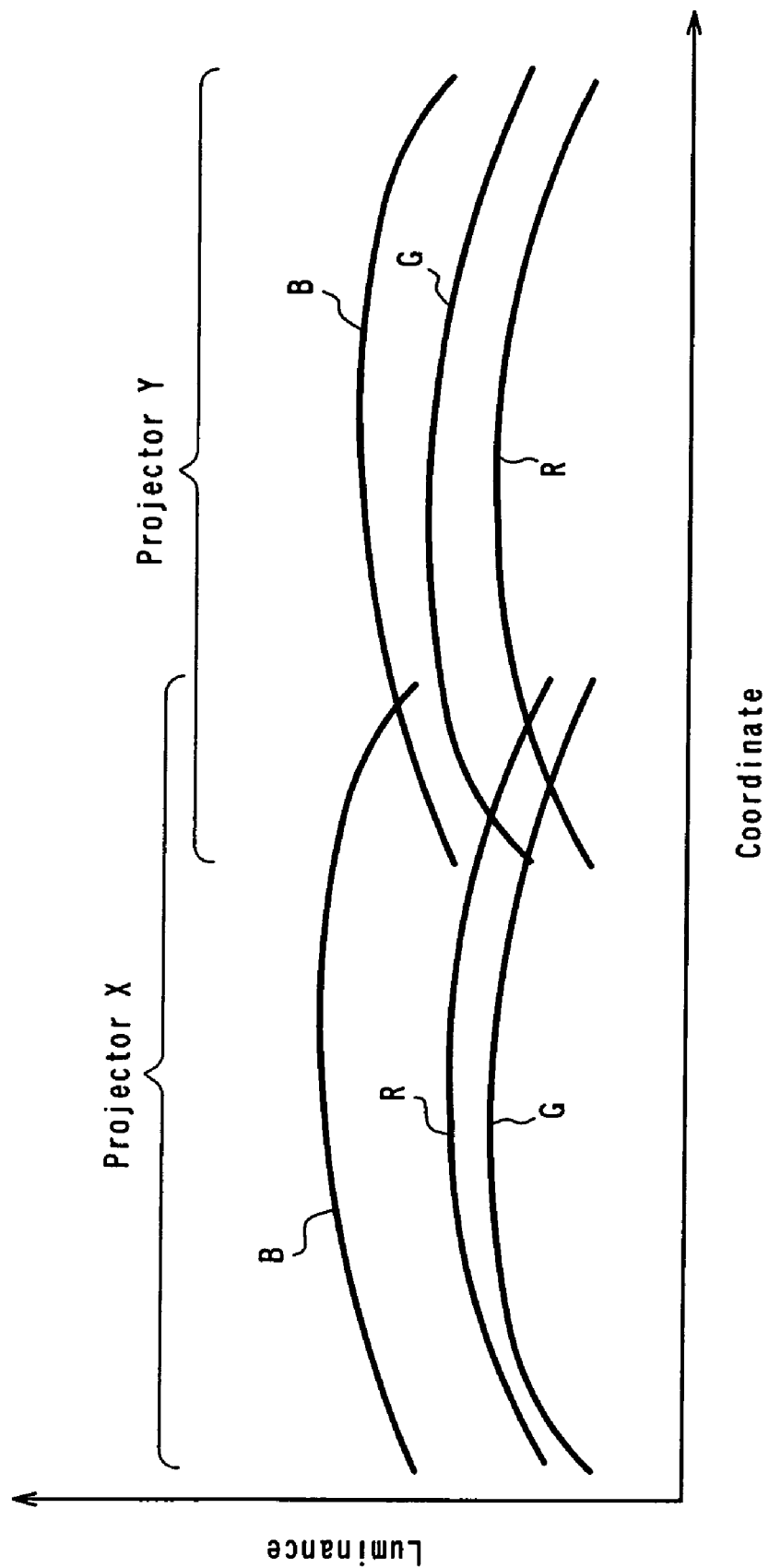
FIG. 7 is a graph showing the luminance distribution of the offset light in the image display section according to the first embodiment.

In other words, in the first embodiment, the luminance distributions of the primary colors R, G and B of the offset image as depicted in FIG. 7 are calculated in the offset primary color component calculating section 63. In FIG. 7, the abscissa represents the horizontal coordinate of the images projected from the projectors, and the ordinate represents the luminance. For the sake of simplification, FIG. 7 shows only two of the projectors 23*a*, 23*b* and 23*c* depicted in FIG. 2, which are indicated as projectors X and Y. It can be appreciated from FIG. 7 that the primary color components of the offset image are different within each image from the corresponding projector (intra-image shading) and between the images from the two projectors (inter-image shading), and such differences result in the color shading of the offset image.

Figure 8:
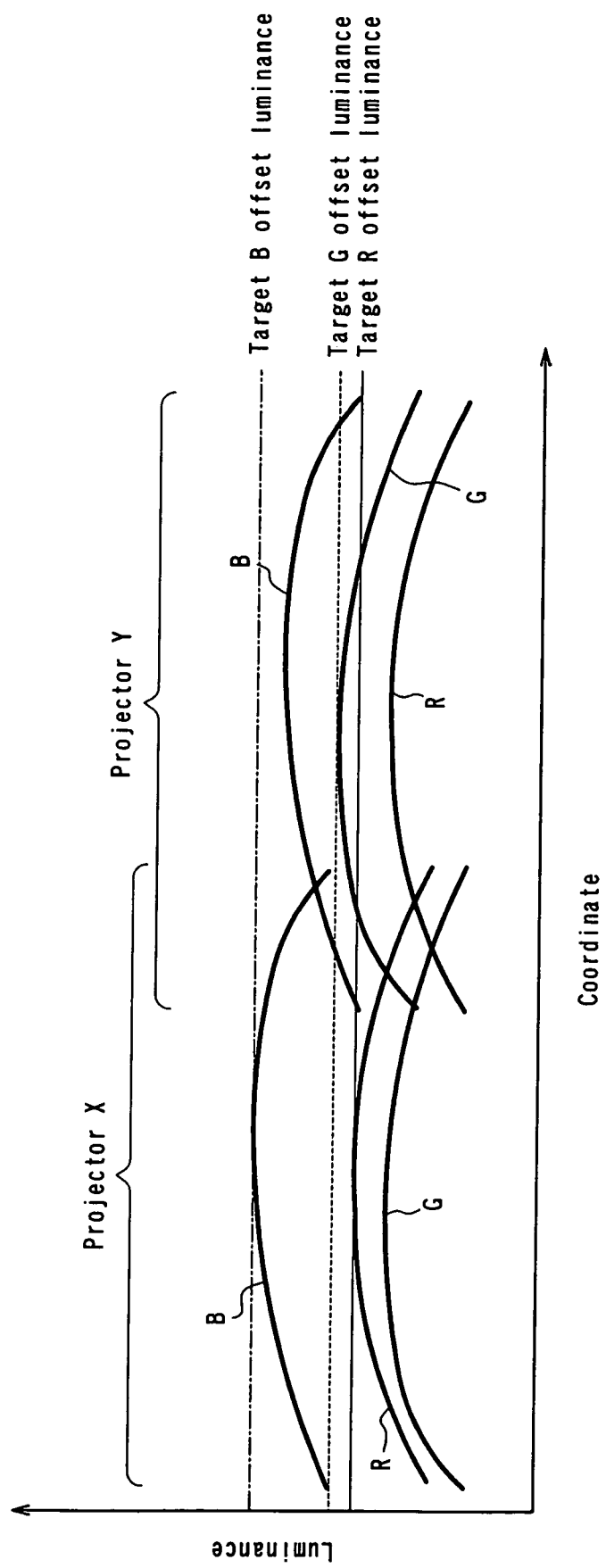
FIG. 8 is a graph showing the relationship between the luminance distribution and the target offset luminance.

In this point of view, at the target offset luminance setting section 64, the maximum luminance levels of the corresponding primary color components are defined as the target offset luminance levels of the primary colors, as shown in FIG. 8. The offset correction data calculating section 65 also serves to calculate the differences between the target offset luminance levels of the primary colors as defined in the target offset luminance setting section 64, on one hand, and the luminance of the primary colors to which the offset image calculated at the offset primary color component calculating section 63 corresponds, on the other hand. The offset correction data calculating section 65 further serves and to calculate the gamma characteristics based on the primary color scale captured data of the primary colors stored in the primary color scale captured data storing section 71. Then, the offset correction data calculating section 64 calculates the signal levels corresponding to the differences between the target offset luminance levels of the primary colors and the luminance of the primary colors. The calculated signal levels are stored as offset correction data, in the offset correction data storing section 54*a*. Then, in the offset correction data operating section 54*b*, the offset correction data are added to the input image data to render the luminance levels of the primary colors RGB equal to one another and to prevent color shading of the offset light within the image from the corresponding projector and between the images from the adjacent projectors.

The gamma correction data calculating section 72 serves to calculate the gamma correction data of the primary colors of each projector based on the primary color scale captured data of the primary colors stored in the primary color scale captured data storing section 71. The calculated gamma correction data are stored in the gamma correction data storing section 55*a*. Then, in the gamma correction data operating section 55*b*, the input image data are corrected so as to render the gamma characteristics of the primary colors of the entire projectors equal to one another. In this instance, when the input signal levels are represented by 0-255 signal levels of eight bits, for example, the gamma correction data can be calculated by using captured data for the entire signal levels of 0-255, or using captured data for a plurality of selected signal levels including the signal level 0 and the signal level 255.

The offset correction data calculating method in the first embodiment will be described in further detail hereinafter, with reference to FIGS. 9-12.

Figure 9:
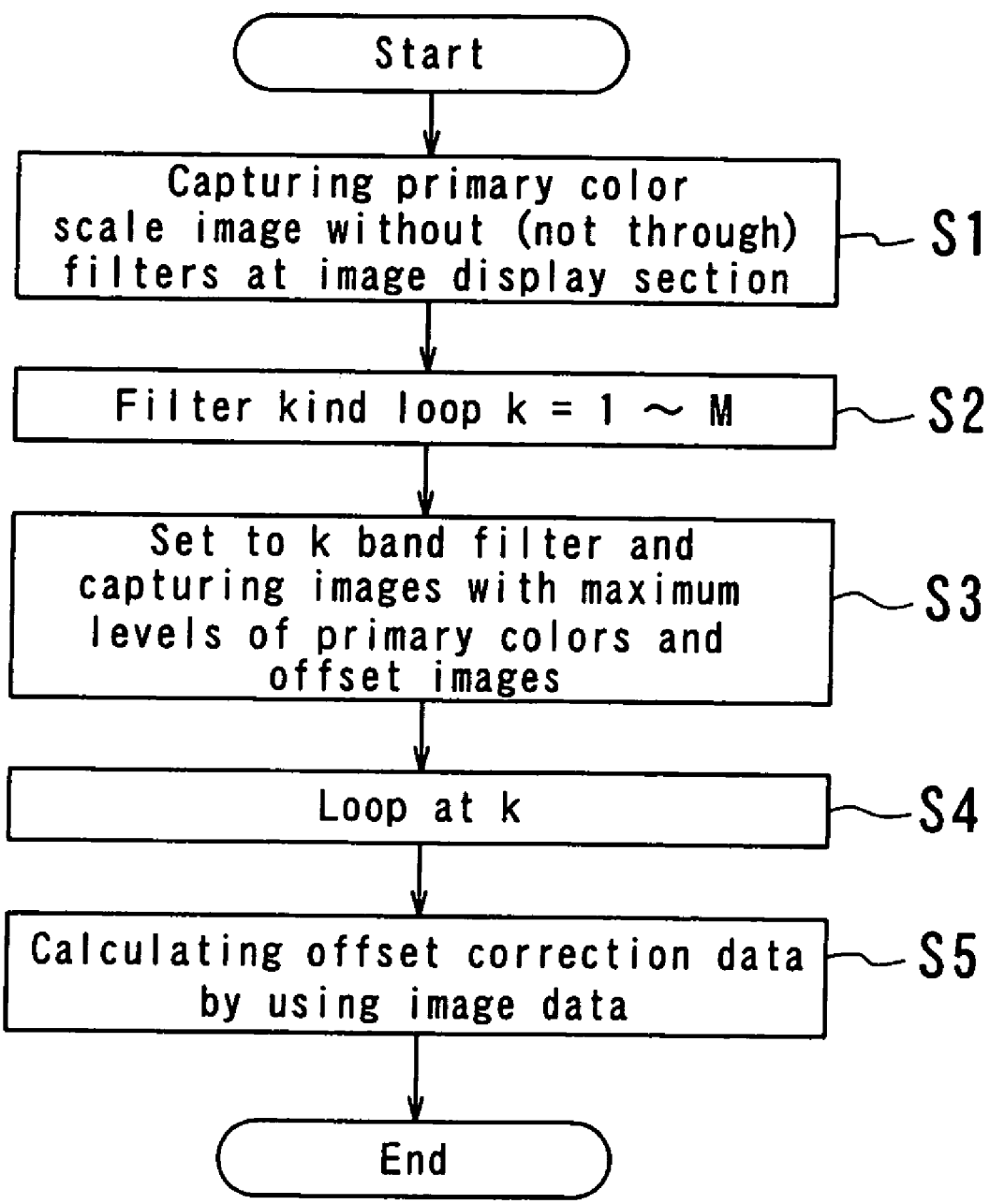
FIG. 9 is a flow chart showing the total steps of the offset correction data calculating method.

FIG. 9 is a flow chart showing the entire steps of the offset correction data calculating method. First of all, the primary color scale images in the image display section 12 are captured with the calibration camera 25 in the through mode, i.e., without the filters (Step S1). The captured data so acquired are stored in the primary color scale captured data storing section 71.

The filter kind (band) k (k=1~M; in the first embodiment, M=3) of the calibration camera 25 is then selected depending upon the kind of the primary color in the image display section 12 (Step S2). The images at the maximum levels of the corresponding primary colors are then captured through the corresponding filters of the selected k band, respectively, and the offset images of the primary colors are captured with the calibration camera 25 (Step S3). Thus acquired captured data at the maximum levels of the corresponding primary colors are stored in the multiband primary color captured data storing section 62, and the captured data of the offset images are stored in the multiband offset captured data storing section 61. Steps S2 and S3 are repeated by switching the filters until the selected k band filter corresponds to the maximum M band filter (Step S4).

Then, the offset correction data are calculated by using the captured data acquired at Steps S1 and S2 (Step S5).

Figure 10:
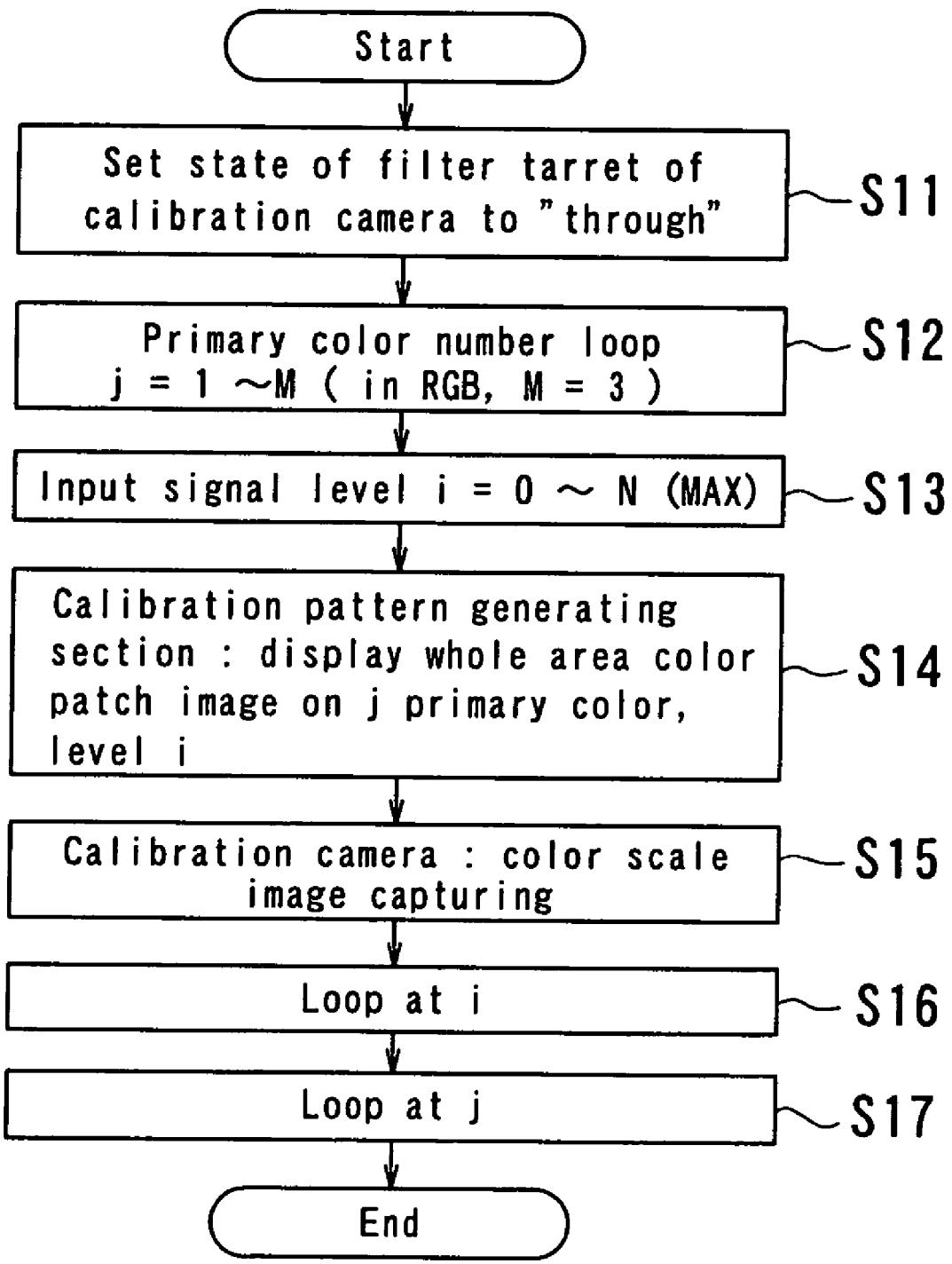
FIG. 10 is a flow chart showing the detailed steps of the color scale image capturing in Step S1 depicted in FIG. 9.

FIG. 10 is a flow chart for explaining the detailed steps of the color scale image capturing in Step S1 shown in FIG. 9. First of all, the state of the filter turret 33 of the calibration camera 25 is set to the through mode (Step S11). The primary color number j (j=1~M; in the first embodiment, M=3 because of the primary colors RGB) in the image display section 12 is then defined (Step S12). The input signal level i (i=0~N (MAX)) of each primary color is then defined (Step S13). The whole area color patch is then generated on the input signal level i of the j primary color in the calibration pattern generating section 13, is displayed through projection with the image display section 12 (Step S14), and is then captured with the calibration camera 25 (Step S15).

Steps S13~S15 are repeated with the input signal level i for the primary color j gradually increased to the maximum input signal level N from the minimum input signal level 0 (Step S16). Step S16 is repeated until the primary color number j reaches M (j=M) (Step S17). In this way, the gamma characteristics of each primary color at the image display section 12 can be acquired.

Figure 11:
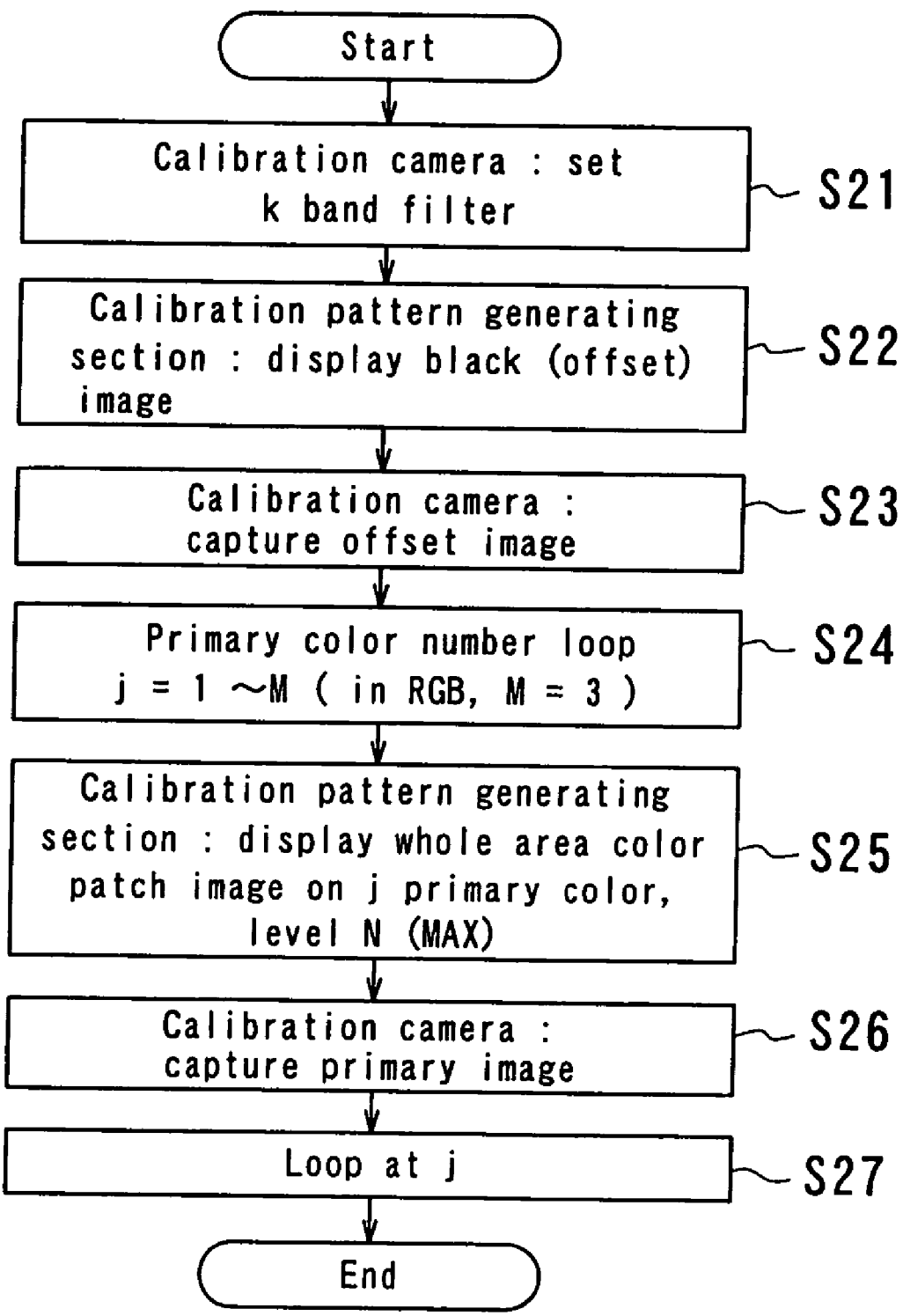
FIG. 11 is a flow chart showing the detailed steps of the primary color maximum level image capturing and the offset image capturing in Steps S2~S4 depicted in FIG. 9.

FIG. 11 is a flow chart for explaining the detailed steps of capturing the primary color maximum level image for each primary color and the offset image in Steps S2~S4 shown in FIG. 9. First of all, the k band filter for a primary color in the image display section 12 is set to the calibration camera 25 (Step S21). The black (offset) image is then generated in the calibration pattern generating section 13, and displayed though projection in the image display section 12 (Step S22), and captured with the calibration camera 25 (Step S23).

The primary color number j (j=1~M; in the first embodiment, M=3 because of the primary colors RGB) in the image display section 12 is then defined (Step S24). The whole area color patch image is then generated in the calibration pattern generating section 13 with the maximum input signal level N of the primary color j (Step S25), and projected and displayed at the image display section 12, and the thus displayed primary color image is captured with the calibration camera 25 (Step S26).

Steps S24~S26 are then repeated until the primary color number j reaches M (j=M) (Step S27). Steps S22~S27 are then repeated with respect to all the bands such that k=M, while switching the filters corresponding to the primary color of the image display section 12 at Step 21. As a result, there are acquired three captured data through the three band filters for the primary color R calibration image, three captured data through the three band filters for the primary color G calibration image, and three captured data through the three band filters for the primary color B calibration image.

Figure 12:
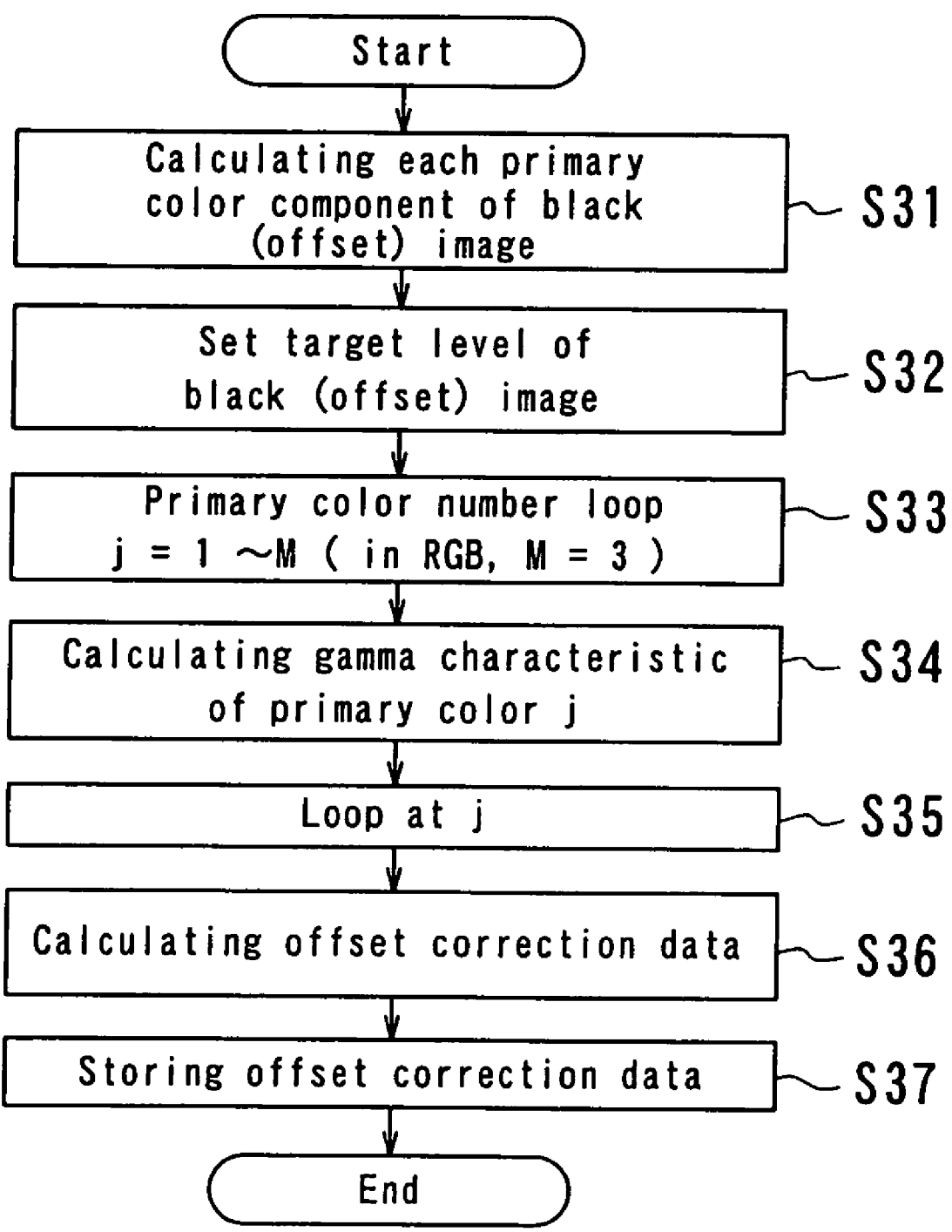
FIG. 12 is a flow chart showing the detailed steps of the offset correction data calculation in Step S5 depicted in FIG. 9.

FIG. 12 is a flow chart for explaining the detailed steps of the offset correction data calculation in Step S5 shown in FIG. 9. First of all, based on the captured data relating to each filter for each primary color of the offset image which are stored in the multiband offset captured data storing section 61 and the captured data at the each primary color maximum level through the three band filters which are stored in the multiband primary color captured data storing section 62, each primary color component of the black (offset) image is calculated at the offset primary color component calculating section 63, (Step S31).

The primary color component calculation of the offset image at Step S31 will be described in further detail hereinafter.

In the first embodiment, since the number of the primary color is set to three because of the primary colors RGB in the image display section 12, the spectrum $O(\lambda)$ of the offset light in the offset image is synthesized by the leakage lights of the primary colors, and can be expressed by the following equation (1):

(Equation 1)

$$O(\lambda) = w_R \cdot R(\lambda) + w_G \cdot G(\lambda) + w_B \cdot B(\lambda) \quad (1)$$

Here, the symbols $R(\lambda)$, $G(\lambda)$ and $B(\lambda)$ designate the corresponding luminescence spectra, respectively, with predetermined signal levels of the corresponding primary colors, which are set to the maximum levels in the first embodiment. The symbols $w_R$, $w_G$ and $w_B$ designate the leakage light ratios of the corresponding primary colors in the offset light, respectively. Therefore, the leakage light ratios of the corresponding primary colors $w_R$, $w_G$ and $w_B$ results in the primary color components of the offset image as to be calculated.

In this instance, if the spectral transmittance of the k band filter is set to $f_k(\lambda)$ (k=1~3), the image signal value $O_k$ (k=1~3) of the offset light captured through the k band filter can be expressed, within a visible light wavelength range (of 380-780 nm), by the following equation (2):

(Equation 2)

$$O_k = \int_{380}^{780} f_k(\lambda) O(\lambda) d\lambda \quad (2)$$

By substituting the equation (1), the equation (2) can be modified as:

(Equation 3)

$$O_k = \int_{380}^{780} f_k(\lambda) O(\lambda) d\lambda \quad (3)$$
$$= w_R \int_{380}^{780} f_k(\lambda) R(\lambda) d\lambda + w_G \int_{380}^{780} f_k(\lambda) G(\lambda) d\lambda +$$
$$w W_B \int_{380}^{780} f_k(\lambda) B(\lambda) d\lambda$$

Assuming that the image signal values are set to $r_k$, $g_k$, $b_k$ when the corresponding maximum level primary colors are captured through the k band filter, the image signal values $r_k$, $g_k$, $b_k$ (k=1~3) can be expressed as:

(Equations 4)

$$r_k = \int_{380}^{780} f_k(\lambda)R(\lambda)d\lambda$$

$$g_k = \int_{380}^{780} f_k(\lambda)G(\lambda)d\lambda$$

$$b_k = \int_{380}^{780} f_k(\lambda)B(\lambda)d\lambda$$

(4)

Therefore, by substituting the equation (4), the equation (3) can be modified as:

(Equation 5)

$$O_k = w_R \cdot r_k + w_G \cdot g_k + w_B \cdot b_k \quad (5)$$

Here, with reference to k=1~3, the equation (5) can be expressed by the following matrix.

(Equation 6)

$$\begin{bmatrix} o_1 \\ o_2 \\ o_3 \end{bmatrix} = \begin{bmatrix} r_1 & g_1 & b_1 \\ r_2 & g_2 & b_2 \\ r_3 & g_3 & b_3 \end{bmatrix} \begin{bmatrix} w_R \\ w_G \\ w_B \end{bmatrix} \quad (6)$$

With the equation (6), the leakage light ratios of the corresponding primary colors $w_R$, $w_G$ and $w_B$ can be obtained, by using the image signal value $O_k$ (k=1~3) of the offset light and the image signal values $r_k$, $g_k$, $b_k$, as:

(Equation 7)

$$\begin{bmatrix} w_R \\ w_G \\ w_B \end{bmatrix} = \begin{bmatrix} r_1 & g_1 & b_1 \\ r_2 & g_2 & b_2 \\ r_3 & g_3 & b_3 \end{bmatrix}^{-1} \begin{bmatrix} o_1 \\ o_2 \\ o_3 \end{bmatrix} \quad (7)$$

Here, the symbol "[ ]$^{-1}$" designates an inverse matrix.

With reference to FIG. 12, after each primary color component has been calculated in Step S31 using the equation (7), the maximum luminance level of each primary color component in the offset image as shown in FIG. 8 is defined as the target offset luminance level of the corresponding primary color, at the target offset luminance setting section 64 (Step S32).

Then, the primary color number j (j=1~M; in the case of RGB, M=3) of each projector is defined (Step S33), and the gamma characteristic of the primary color j is calculated based on the primary color scale captured data of the primary color j stored in the primary color scale captured data storing section 71 (Step S34).

Steps S33 and S34 are repeated until the primary color number becomes j=M (Step S35). Then, the difference between the target offset luminance level of each primary color and the luminance level of the corresponding primary color in the offset image is calculated in the offset correction data calculating section 65, the signal level corresponding to the difference is calculated from the gamma characteristic, and the thus acquired signal level is calculated as the offset correction data (Step S36). The offset correction data is stored in the offset correction data storing section 54a (Step S37).

As described above, according to the first embodiment, in order to detect the primary color components of the image displaying section 12 in the offset image, the spectral transmittances of the filters 33 provided on the calibration camera 25 for the corresponding primary colors are set so as to pass the luminescence band range of the corresponding primary colors therein as shown in FIG. 4, and enlarged through overlapping of the spectral transmittances of the filters 33 for the other primary colors. It is therefore possible to manufacture the filters easily and at low cost, and to shorten exposure time required for calibration.

In the acquisition of the multiband primary color captured data of the primary colors in the image display section 12, since each primary color image is displayed through projection at the maximum level, the S/N ratios of the primary color captured data can be enhanced. Therefore, the primary color components in the offset image can be calculated precisely based on the multiband offset captured data and the multiband primary color captured data, so that the offset correction data can be calculated precisely based on the offset primary color components. As a result, the color shadings of the image from one projector and the seams between adjacent images from a plurality of projectors can be corrected precisely, and the displaying quality can be improved.

Moreover, since the transmittance wavelength-band range of each filter 33 for the corresponding primary color in the image display section 12 is wide, the color shadings of the image from one projector and the seams between adjacent images from a plurality of projectors can be corrected precisely, with the same filters even if at least one of the projectors in the image display section are replaced and the total spectrum characteristic of the projectors relating to the primary colors is thereby changed.

Second Embodiment

In the calibration system of the first embodiment, the offset light may contain near-infrared leakage light in addition to the leakage lights of the primary colors. In this case, if the filter 33 of the calibration camera 25 has a spectral transmittance that covers the near-infrared band range, the filter 33 may not separate the leakage light within the near-infrared band range and the leakage lights of the primary colors, resulting in degradation of the color shading correction accuracy.

Similarly, the offset light may contain near-ultraviolet leakage light in addition to the leakage lights of the primary colors. In this case, if the filter 33 of the calibration camera 25 has a spectral transmittance that covers the near-ultraviolet band range, the filters 33 may not separate the leakage light within the near-ultraviolet band range and the leakage lights of the primary colors, also resulting in degradation of the color shading correction accuracy.

In this point of view, according to the present second embodiment, the capturing lights within the near-infrared band range and the capturing lights within the near-ultraviolet band range, which may be harmful for the enhancement of the correction accuracy of the color shading, are cut off.

Figure 13:
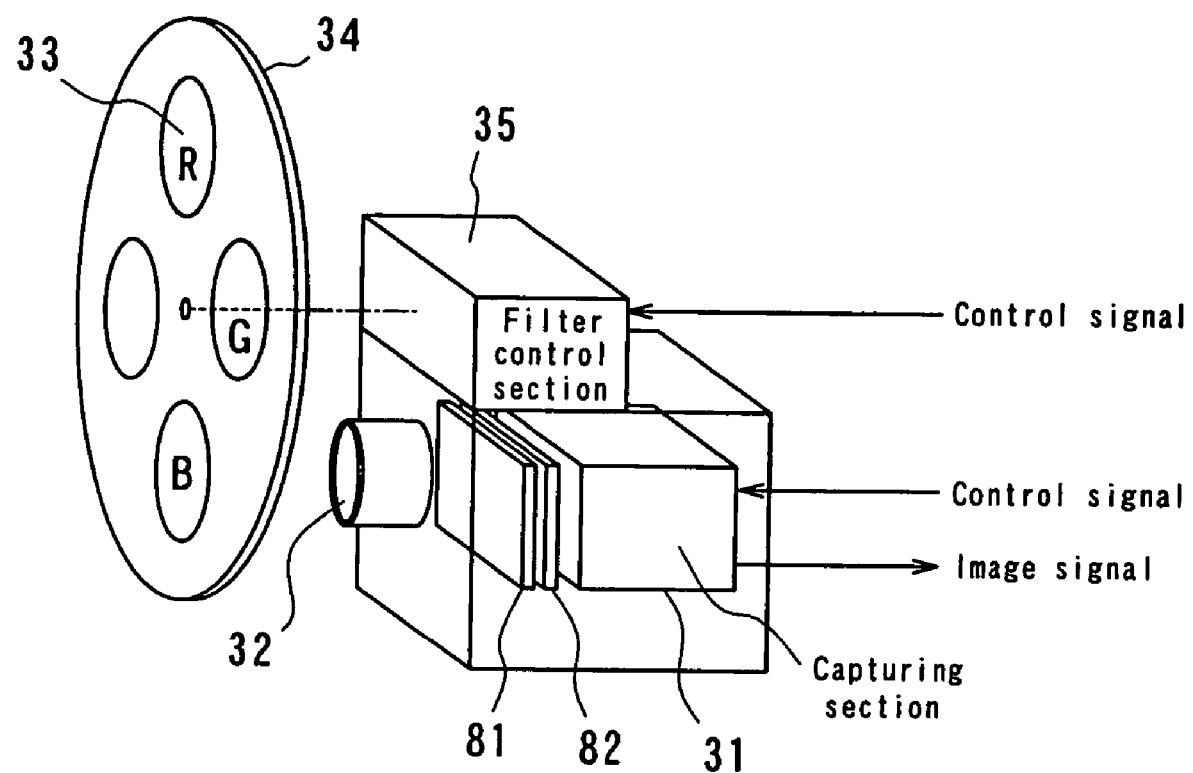
FIG. 13 is a schematic view showing the calibration camera structure to be employed for the calibration system according to the second embodiment of the present invention.

FIG. 13 is a schematic view showing the calibration camera structure to be employed in the calibration system of the second embodiment. In the calibration camera 25, an IR cut filter 81 for cutting off a near-infrared band range light and an UV cut filter 82 for cutting off a near-ultraviolet band range light are provided in the capturing path between the capturing section 31 and the capturing lens 32. The structure and function of the other components are similar to those in the first embodiment.

Figure 14:
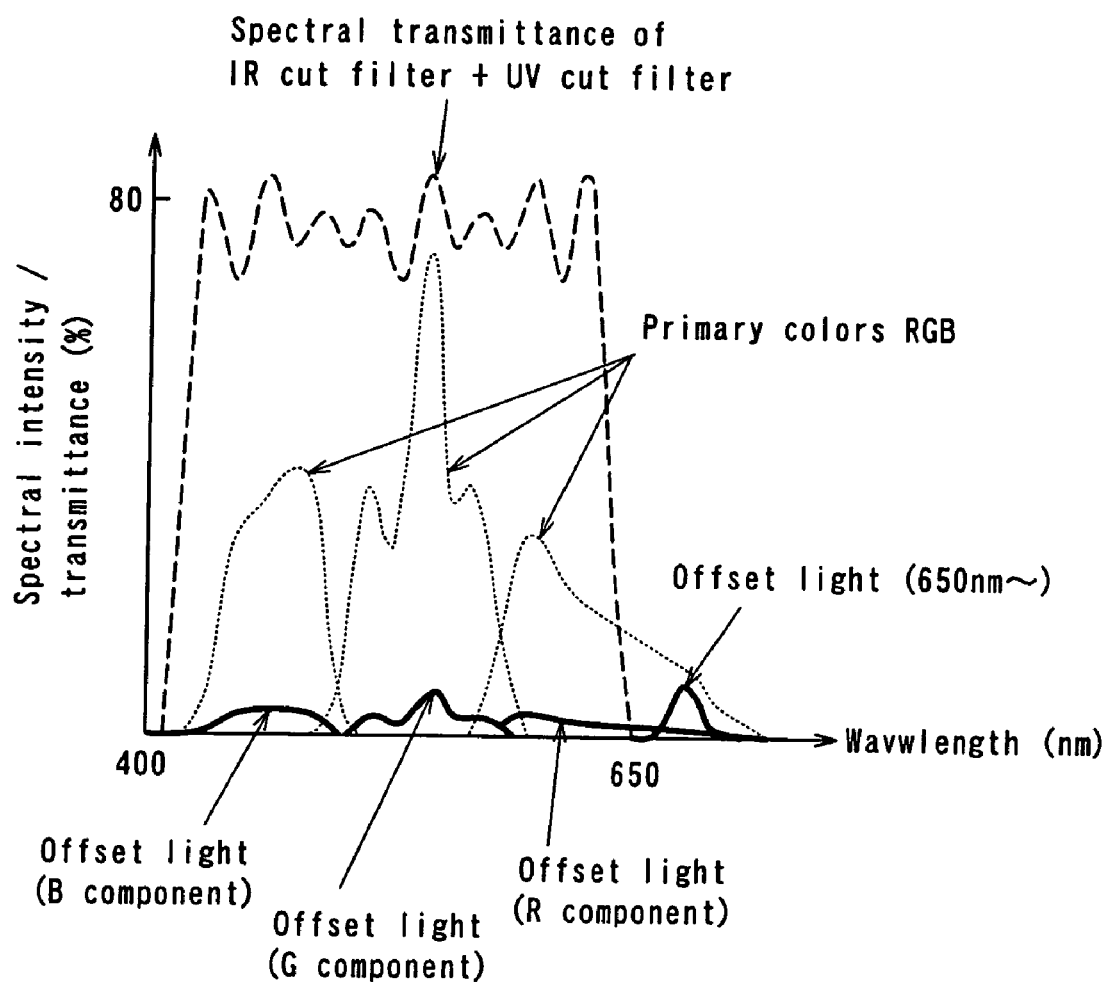
FIG. 14 is a graph showing the spectral transmittance characteristics by means of the IR cut filter and the UV cut filter depicted in FIG. 13.

The IR cut filter 81 is designed to cut off a near-infrared band range light within a wavelength range above 650-780 nm, e.g., above 650 nm, and the UV cut filter 82 is designed to cut off a near-ultraviolet band range light, e.g., within a wavelength range below 400 nm, so that the spectral transmittance characteristic as shown in FIG. 14 can be obtained by using the IR cut filter 81 and the UV cut filter 82.

According to the calibration camera 25 of the second embodiment, only the primary color components can be extracted from the offset light, so that the color shading can be corrected precisely. In this instance, the lights within a wavelength range over 650-780 nm and the lights within a wavelength range below 400 nm are less sensible to human eyes, so that the correction of the color shading by means of the cutting off of the above ranged lights is not essentially affective over the quality of the displayed image.

In the second embodiment, although both of the IR cut filter 81 and the UV cut filter 82 are provided, only either one of these filters may be provided depending upon the spectrum of the offset light.

Third Embodiment

Figure 15:
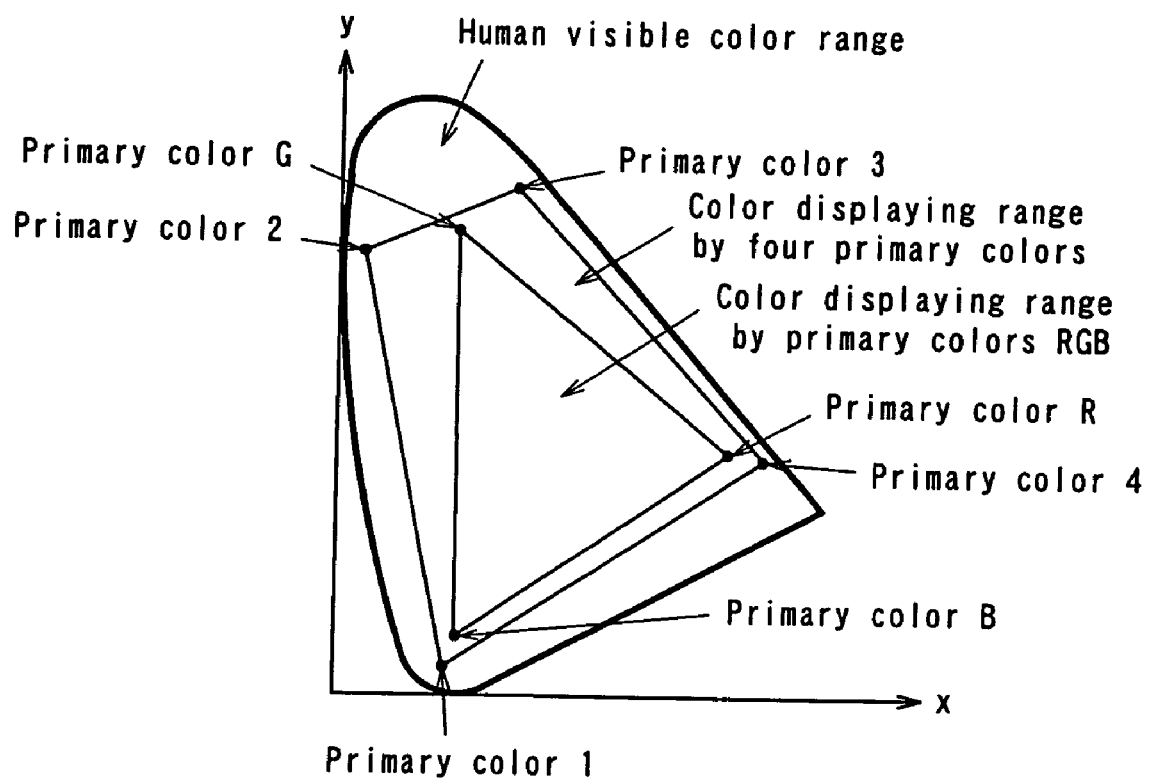
FIG. 15 is a chromaticity coordinate showing the primary color positions in the image display section according to the third embodiment of the present invention.

In the third embodiment, the number of the primary color is set to four, unlike the first and the second embodiments. The four primary colors are set to primary colors 1-4 in the chromaticity coordinate in FIG. 15, for example.

Figure 16:
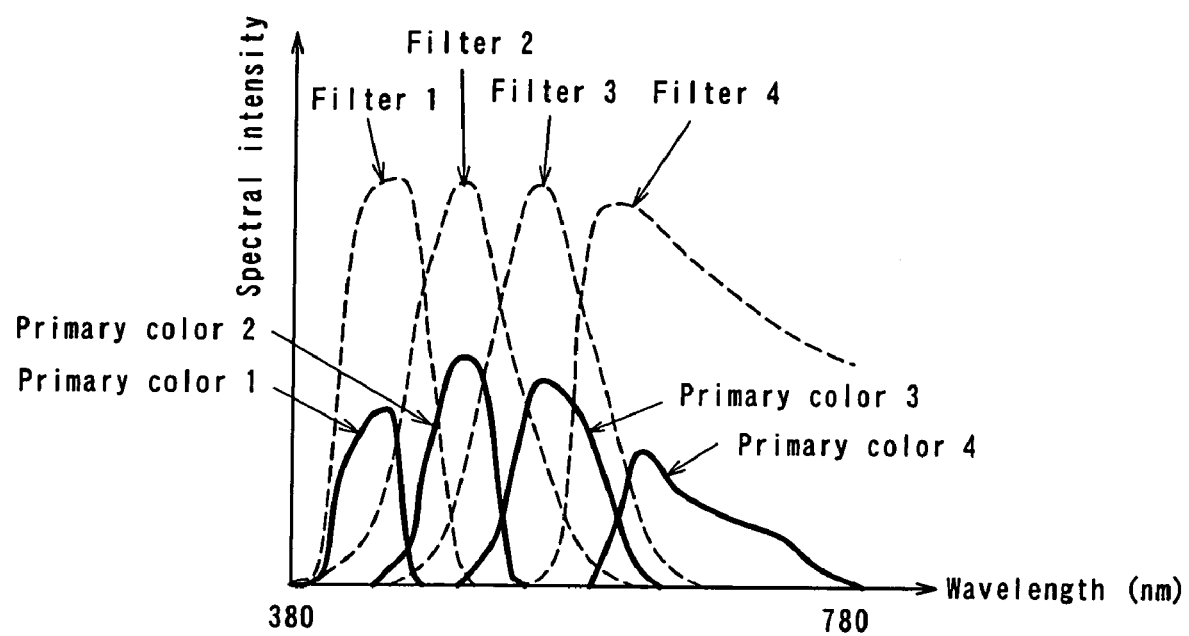
FIG. 16 is a graph showing the spectral transmittance characteristics of the four band filters of the calibration camera to be employed in the third embodiment.

Furthermore, four band filters are mounted on the calibration camera 25 corresponding to the four primary colors in the image display section 12. As shown in FIG. 16, the spectral transmittance characteristics of the filters 1-4 are determined so that each filter can pass the luminescence band range of the corresponding primary color in the image display section 12, and so as to be overlapped with the spectral transmittance characteristics of the filters corresponding to the other primary colors.

In this way, the color shading of the offset light can be corrected in the same manner as the first embodiment.

As in the third embodiment, when the primary color number in the image display section 12 is set to four, it is possible to display a color with high chromaticity, which could not be displayed by using the normal three primary colors RGB, so that a color of an image can be reproduced with high fidelity. In such an image display device, the color shading correction enables the color reproduction accuracy to be further enhanced.

Fourth Embodiment

In the fourth embodiment, the image capturing section 14 in the calibration system as used in the previous embodiments is comprised of a calibration camera that outputs the captured data of the corresponding primary colors simultaneously. For example, when the primary colors in the image display section 12 are the RGB primary colors, a digital camera for outputting the captured data of the corresponding primary colors RGB may be employed as the image capturing section 14. Here, the spectral transmittance characteristics of the filters to be employed in such a calibration camera are determined so as to allow transmission of the luminescence band range of the corresponding primary color, and to be enlarged through the overlapping with the spectral transmittance characteristics of the filters for the other primary colors, as in the previous embodiments.

In calibration, in order to acquire the primary color scale captured data, the calibration images of gray scale are displayed sequentially through projection by the image display section 12, and the displayed color scale images are sequentially captured with the calibration camera.

Thus, as compared to the calibration system of the first embodiment, the calibration system of the fourth embodiment is basically different from in structure of the gamma correction data calculating section 45 shown in FIG. 6, but is essentially the same in structure of the other components. In this point of view, the features of the fourth embodiment different from the ones of the first embodiment will be described hereinafter, assuming that the primary colors in the image display section 12 are three primary colors R, G and B.

Figure 17:
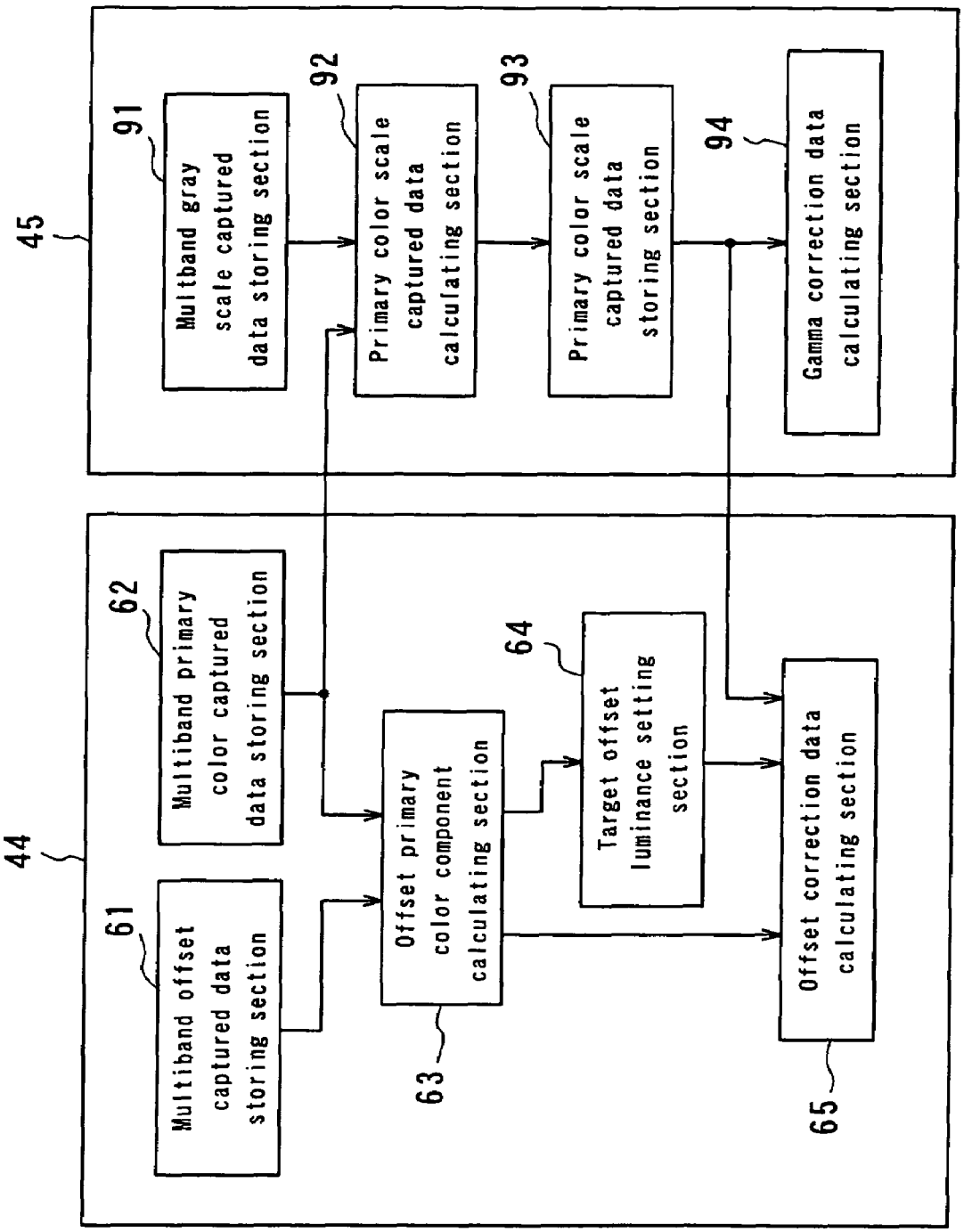
FIG. 17 is a block diagram showing the structure of the offset correction data calculating section and the gamma correction data calculating section in the fourth embodiment according to the present invention.

FIG. 17 is a block diagram showing the structure of the offset correction data calculating section 44 and the gamma correction data calculating section 45 in the fourth embodiment. Similar to FIG. 6, the offset correction data calculating section 44 includes the multiband offset captured data storing section 61, the multiband primary color captured data storing section 62, the offset primary color component calculating section 63, the target offset luminance setting section 64, and the offset correction data calculating section 65.

In the fourth embodiment, since the captured data of the corresponding primary colors RGB can be acquired simultaneously, the offset captured data of the corresponding primary colors RGB, which are acquired by capturing the offset images displayed when the calibration pattern image data of the corresponding primary colors RGB at the zero (black) input signal levels of the primary colors RGB are transferred to the image display section 12, are simultaneously stored in the multiband offset captured data storing section 61. Also, the primary color captured data of the corresponding primary colors RGB, which are acquired by capturing the primary color images displayed when the calibration pattern image data of the corresponding primary colors at the maximum input signal levels of the primary colors RGB are transferred to the image display section 12, are simultaneously stored in the multiband primary color captured data storing section 62.

The offset primary color component calculating section 63 and the target offset luminance setting section 64 are similar to those explained above with reference to the first embodiment. Thus, in the offset primary color component calculating section 63, the primary color components of the offset image are calculated based on the offset captured data of the corresponding primary colors stored in the multiband offset captured data storing section 61, and the captured data of the corresponding primary colors at the maximum signal levels of the primary colors stored in the multiband primary color captured data storing section 62. Furthermore, in the target offset luminance setting section 64, the target offset luminance of the primary colors are defined based on the primary color components of the offset image calculated at the offset primary color component calculating section 63.

In the offset correction data calculating section 65, the offset correction data of the corresponding primary colors from the projectors composing the image display section 12 are calculated based on the primary color components of the offset image calculated at the offset primary color component calculating section 63, the target offset luminance of the primary colors set at the target offset luminance setting section 64, and the primary color scale captured data of the primary colors stored in the primary color scale capturing data storing section 93, which is included in the gamma correction data calculating section 45, as will be described hereinafter. The calculated offset correction data are supplied to, and stored in the offset correction data storing section 54*a* in the offset correction section 54 shown in FIG. 5.

The gamma correction data calculating section 45 includes a multiband gray color scale captured data storing section 91, an primary color scale captured data calculating section 92, an primary color scale captured data storing section 93, and a gamma correction data calculating section 94.

The multiband gray color scale captured data storing section 91 serves to store the primary color scale captured data acquired by capturing the color scale image of gray scale which are displayed when the calibration pattern image data are transferred to the image display section 12, with the input signal levels of the primary colors sequentially changed at a predetermined rate.

The primary color scale captured data calculating section 92 serves to conduct a calculation similar to the that in the offset primary color component calculating section 63, based on the gray color scale captured data stored in the multiband gray color scale captured data storing section 91 and the captured data at the maximum signal levels of the primary colors stored in the multiband primary color captured data storing section 62, so as to calculate the captured data of each primary color for each color scale, in which influences due to the overlapping of the spectral transmittance characteristics of the filters in the calibration camera are eliminated. The calculated data so obtained are stored in the primary color scale captured data storing section 93.

The gamma correction data calculating section 94 serve to calculate the gamma correction data of the corresponding primary colors of the projectors constituting the image display section 12, in the same manner as the first embodiment. The calculated gamma correction data so obtained are stored in the gamma correction data storing section 55*a* of the gamma correction section 55 shown in FIG. 5.

The offset correction data calculating method in the fourth embodiment will be described below with reference to FIGS. 18 and 19.

Figure 18:
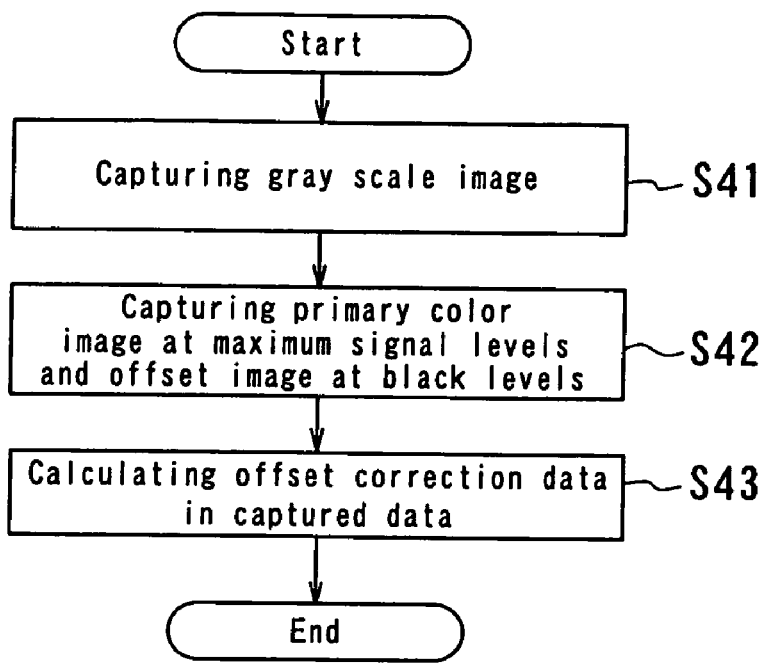
FIG. 18 is a flow chart showing the entire steps in the offset correction data calculating method in the fourth embodiment.

FIG. 18 is a flow chart showing the entire steps in the offset correction data calculating method. First of all, the gray scale images are sequentially displayed by the image display section 12 and captured with the calibration camera (Step S41). Then, the primary color scale captured data obtained simultaneously for each gray scale are stored in the multiband gray color scale captured data storing section 91.

Then, the projected images in the image display section 12, for which the signal levels of only R, only G and only B are set at the maximum signal levels, and the projected images for which the signal levels of R, G and B are set at the minimum signal levels (black levels), are captured with the calibration camera (Step S42). The captured data for each band at the maximum signal levels of the corresponding primary colors are stored in the multiband primary color captured data storing section 62, and the captured data for each band at the black levels are stored in the multiband offset captured data storing section 61.

Subsequently, based on the captured data obtained at Steps S41 and S42, the offset correction data are calculated (Step S43).

Figure 19:
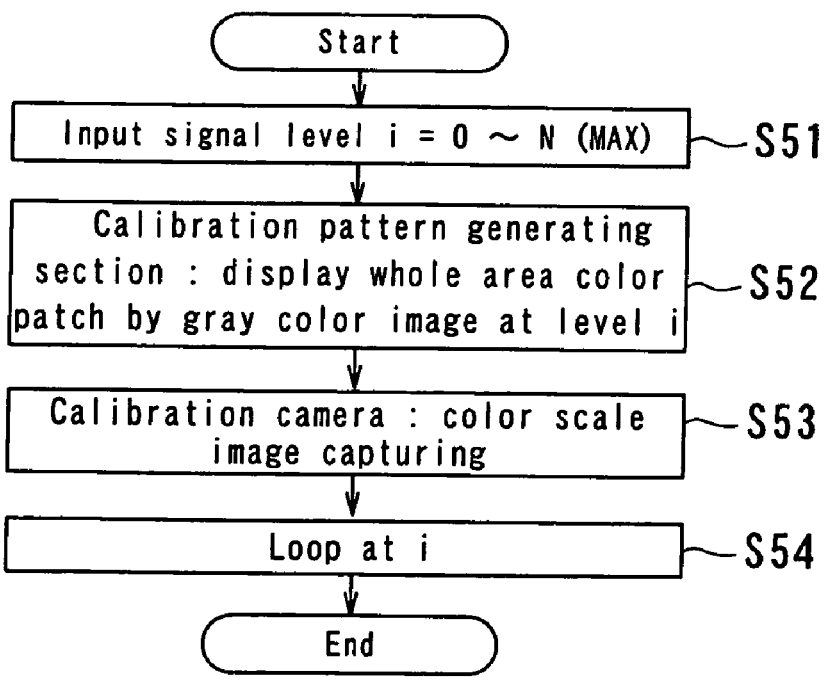
FIG. 19 is a flow chart showing the detailed steps for the gray scale image capturing at Step S41 shown in FIG. 18.

FIG. 19 is a flow chart showing the detailed steps in the gray scale image capturing at Step S41. First of all, the input signal level i (i=0~N (MAX)) of each primary color is defined (Step S51). Then, the whole area gray patch is generated based on the input signal level i in the calibration pattern generating section 13, displayed through projection by the image display section 12 (Step S52), and captured with the calibration camera (Step S53). Steps S51~S53 are then repeated while the input signal level i is gradually increased to the maximum input signal level N from the minimum input signal level 0 (Step S54).

As described above, according to the fourth embodiment, the calibration camera is designed to simultaneously output the captured data of the corresponding primary colors in the image display section 12. Thus, for example, when the primary colors at the image display section 12 are RGB, the calibration camera in the form of a digital camera simultaneously outputs the captured data of the corresponding primary colors RGB. Therefore, as compared with the first embodiment, the number of operation required for capturing the calibration images can be reduced remarkably, and the calibration time can be shortened. Moreover, since the transmittance wavelength band range of the filters provided for the calibration camera corresponding to the primary colors in the image display section 12 can be enlarged as in the previous embodiments, the calibration camera can be manufactured easily and at low cost.

Modified Embodiment

Figure 20:
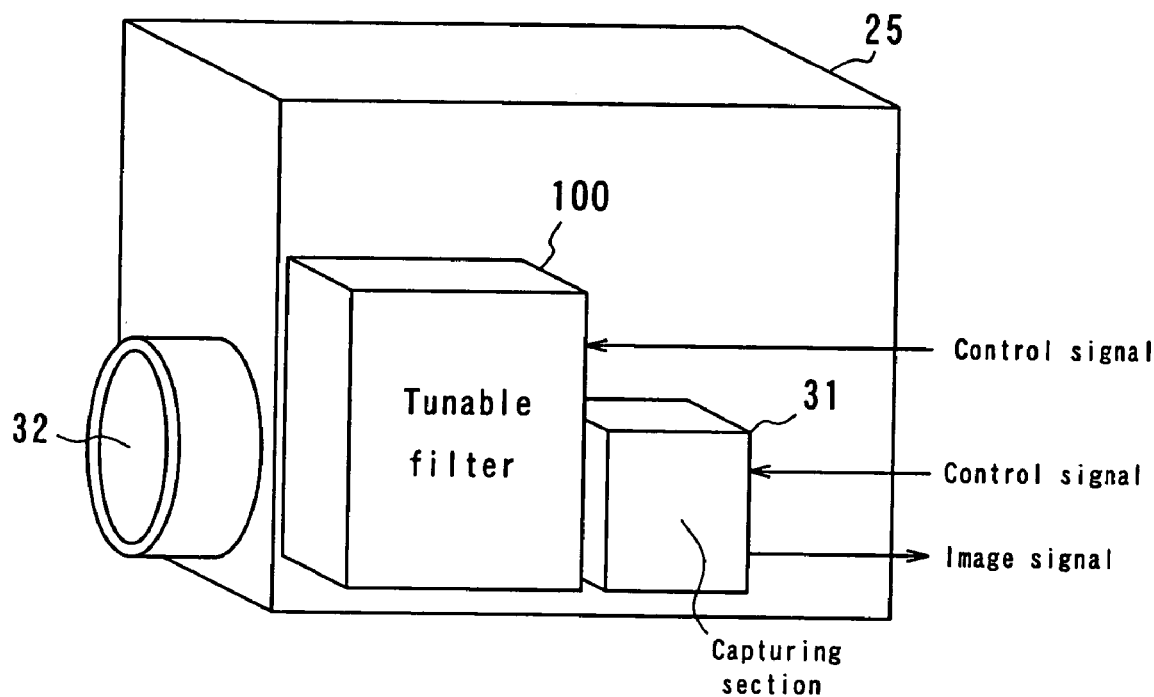
FIG. 20 is an explanatory view showing a modified calibration camera that may be employed in the present invention.

The present invention is not limited to the above-mentioned embodiments, and various changes or modification may be made without departing from the scope of the present invention. For example, in the first embodiment, the calibration camera 25 is provided with the filter turret 34, and the filter turret 34 is equipped with the filters 33 for the corresponding primary colors and formed with the through-hole. However, the filter turret 34 may be replaced by a tunable filter 100 made of a liquid tunable filter, for example, and arranged in the path between the capturing lens 32 and the capturing section 31, as shown in FIG. 20. In this instance, the spectral transmittance characteristic of the tunable filter 100 can be switched electrically, based on the control signals from the personal computer 21 shown in FIG. 2, so as to allow transmission of a luminescence band ranges of each primary color and transmission of at least part of luminescence band ranges of the other primary colors, as in the previous embodiments. In this way, it is possible to downsize the calibration camera 25 and simplify the control of the tunable filter 100.

Figure 21:
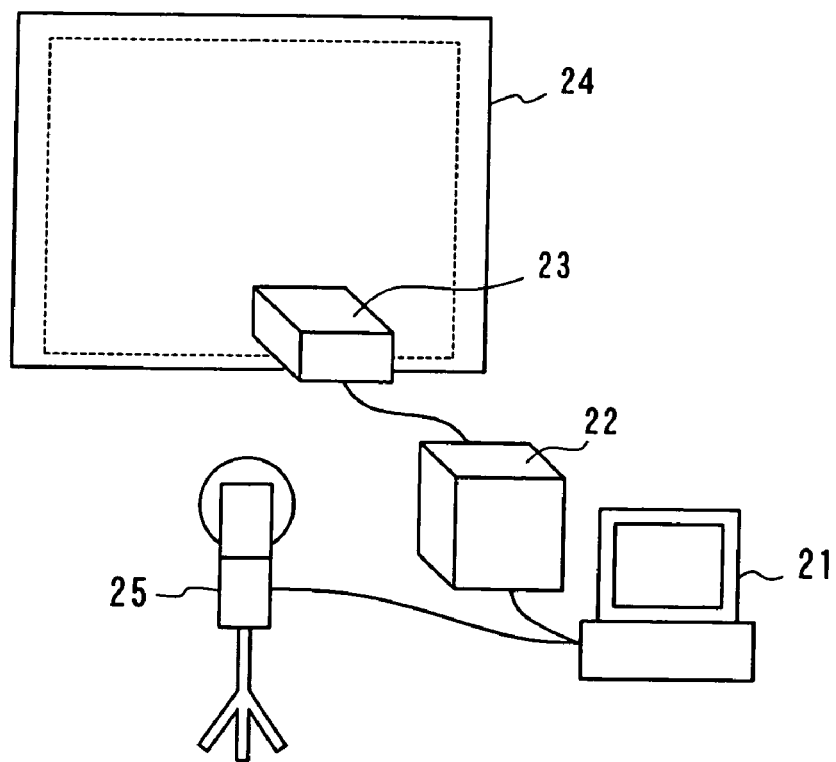
FIG. 21 is an explanatory view showing another modified calibration camera that may be employed in the present invention.
Figure 22:
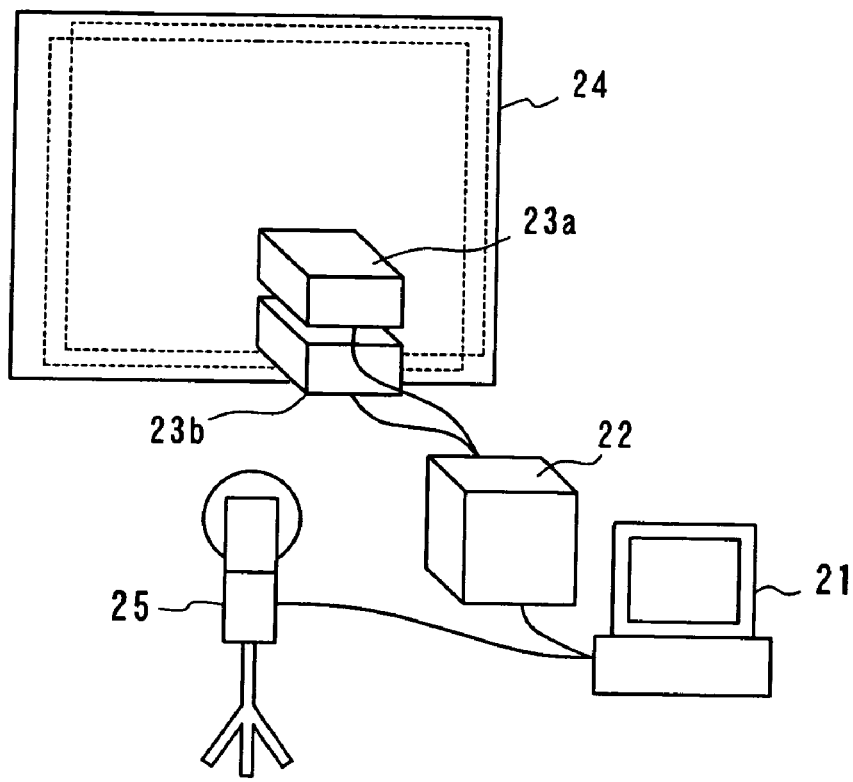
FIG. 22 is an explanatory view showing still another modified calibration camera that may be employed in the present invention.

Further, the image display section 12 is comprised of a plurality of projectors 23*a*, 23*b* and 23*c* in the above-mentioned embodiments. However, the present invention can be also effectively applied to an image display section comprising a single projector 23 as shown in FIG. 21, or to an image display section wherein an image is displayed by using two projectors 23*a* and 23*b* for different primary colors as shown in FIG. 22, so as to increase number of the primary colors, or a three-dimensional image with an azimuth difference is displayed by using two projectors, or the same images from two projectors are displayed and synthesized so as to increase the displaying luminance.

Figure 23:
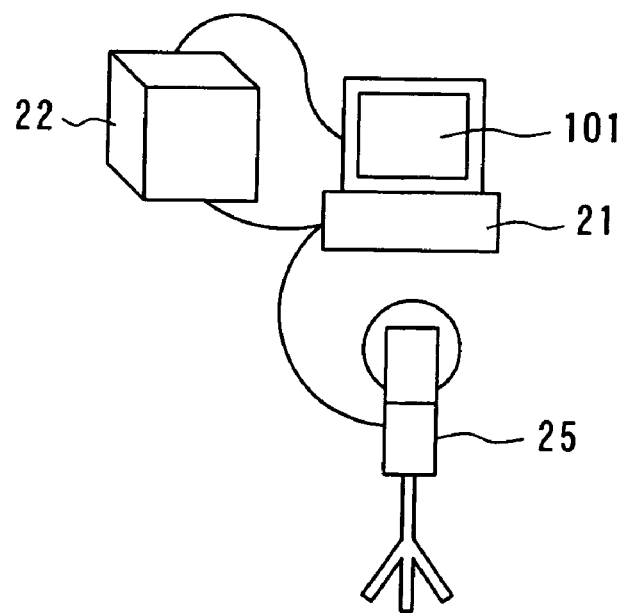
FIG. 23 is an explanatory view showing a further modified calibration camera that may be employed in the present invention.
Figure 24:
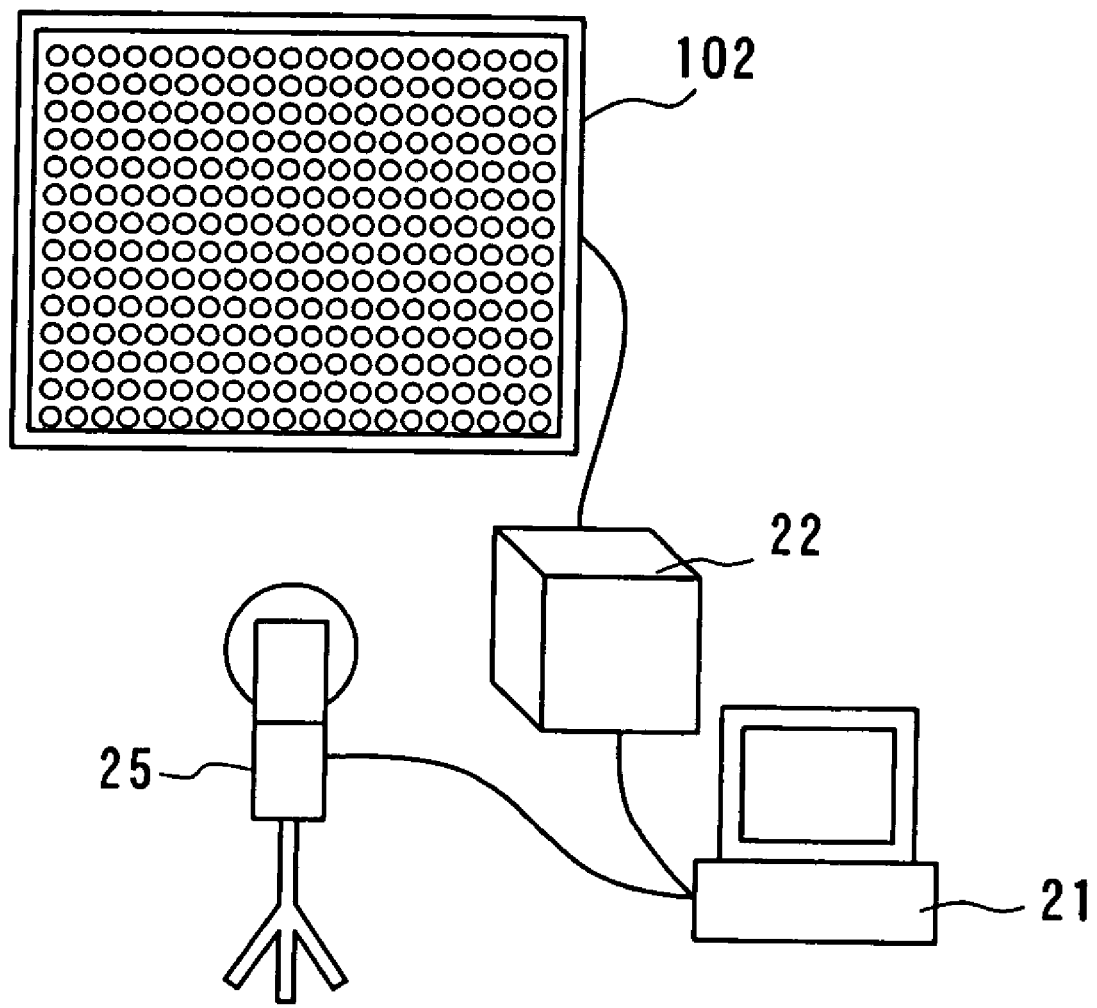
FIG. 24 is an explanatory view showing a still further modified calibration camera that may be employed in the present invention.

Furthermore, the image display section 12 is not restricted to the projectors, and the present invention can also be effectively applied to an image display section 101 comprised of a desktop or laptop liquid crystal display or a desktop CRT display as shown in FIG. 23, or an LED display 102 as shown in FIG. 24. Here, throughout FIGS. 20-24, the same reference numerals are used to denote the components similar in structure or function to those in the previous embodiments.

Moreover, in the above-mentioned embodiments, the multiband primary color captured data are obtained by displaying each primary color images at the maximum signal level for each primary color. The multiband primary color captured data, however, may be obtained by displaying each primary color images at a predetermined signal level of each primary color. Further, the gain correction section 53 depicted in FIG. 5 may be omitted, and the gain correction may be conducted by the gamma correction section 55.

INDUSTRIAL APPLICABILITY

It will be appreciated from the foregoing detailed description that, according to the acquiring method of correction data for an image display device of the present invention, since the offset correction data are calculated based on the multiband offset data captured data, the multiband primary color captured data, and the primary color scale captured data of the corresponding primary colors in the image display section, the transmittance wavelength-band ranges of the filters for the corresponding primary colors can be enlarged. Therefore, the exposure time required for calibration can be shortened without increase in cost, and the changes in spectral characteristic of the corresponding primary colors in the image display device can be effectively compensated so as to precisely correct the color shading.

Moreover, according to the calibration system for an image display device of the present invention, since the image capturing section includes filters with wide transmittance wavelength-band range allowing transmission of a luminescence band ranges of a corresponding primary color and transmission of at least part of luminescence band ranges of the other primary colors, and the image correction data calculating section serves to calculate the offset correction data based on the multiband offset captured data, the multiband primary color captured data, and the primary color scale captured data obtained through the capturing in the image capturing section, the correction data acquisition according to the present invention can be carried out easily and simply.

The invention claimed is:

1. A correction data acquisition method for an image display device wherein an image is displayed with a plurality of primary colors, comprising the steps of:
    displaying an offset image with a black signal level at an image display section in said image display device;
    capturing said offset image by successively switching filters having bands corresponding to said plurality of primary colors, respectively, so as to acquire a multiband offset captured data;
    sequentially displaying primary color images at said image display section, said primary color images having predetermined signal levels for the corresponding primary colors;
    sequentially capturing said primary color images while switching said filters for the corresponding primary colors, so as to acquire multiband primary color captured data;
    displaying primary color scale images at said image display section, said primary color scale images having an input signal level that is gradually changed for each of the corresponding primary colors;
    sequentially capturing said primary color scale images so as to acquire a primary color scale captured data; and
    calculating an offset correction data based on said multiband offset captured data, said multiband primary color captured data, and said primary color scale captured data.

2. A correction data acquisition method for an image display device wherein an image is displayed with a plurality of primary colors, comprising the steps of:
    displaying an offset image with a black level at an image display section in said image display device;
    capturing said offset image simultaneously through filters for the corresponding primary colors, so as to acquire a multiband offset captured data;
    sequentially displaying primary color images at said image display section, said primary color images having signal levels of the corresponding primary colors;
    capturing said primary color images simultaneously through said filters for the corresponding primary colors, so as to acquire a multiband primary color captured data;
    sequentially displaying gray scale images in said image display section, said gray scale images having gray scale signal levels;
    simultaneously capturing said gray scale images through said filters for the corresponding primary colors, so as to acquire primary color scale captured data; and
    calculating an offset correction data based on said multiband offset captured data, said multiband primary color captured data, and said primary color scale captured data.

3. The correction data acquisition method according to claim 1, wherein, upon capturing for acquisition of said multiband offset captured data, said multiband primary color captured data and said primary color scale captured data, capturing of lights within a wavelength range above 650-780 nm is cut off.

4. The correction data acquisition method according to claim 1, wherein, upon capturing for acquisition of said multiband offset captured data, said multiband primary color captured data and said primary color scale captured data, capturing of lights within a wavelength range below 400 nm is cut off.

5. The correction data acquisition method according to claim 1, wherein the number of said primary colors is not less than three.

6. The correction data acquisition method according to claim 1, wherein said image display section includes a plurality of projectors for projecting and displaying one image.

7. The correction data acquisition method according to claim 1, wherein said filters are designed so as to allow transmission of a luminescence band ranges of a corresponding primary color and transmission of at least part of luminescence band ranges of the other primary colors.

8. The correction data acquisition method according to claim 1, wherein a tunable filter is used as said filters, said tunable filter being electrically controllable so as to allow transmission of a luminescence band range of a corresponding primary color and transmission of at least part of luminescence band ranges of the other primary colors.

9. A calibration system for an image display device including an image display section for displaying an image with a plurality of primary colors, comprising:
    a calibration pattern generating section for selectively displaying, at said image display section, calibration patterns of an offset image at a black level, of primary color images at predetermined signal levels of the corresponding primary colors, and of the corresponding primary colors acquired by sequentially changing input signal levels of the corresponding primary colors;
    an image capturing section which includes filters having bands for the corresponding primary colors and a through-hole, said filters being designed for allowing transmission of a luminescence band ranges of a corresponding primary color and transmission of at least part of luminescence band ranges of the other primary colors, said image capturing section being for capturing said calibration patterns displayed at said image display section, while selecting said filters or said through-hole; and an image correction data calculating section for calculating offset correction data based on multiband offset captured data acquired by sequentially capturing said offset image with said image capturing section while switching said filters for the corresponding primary colors, multiband primary color captured data acquired by sequentially capturing said primary color images with said image capturing section while switching said filters for the corresponding primary colors, and primary color scale captured data acquired by sequentially capturing said primary color scale images with said image capturing section through said through-hole.

10. A calibration system for an image display device including an image display section for displaying an image with a plurality of primary colors, comprising:

a calibration pattern generating section for selectively displaying, at said image display section, calibration patterns of an offset image at a black level, of primary color images at predetermined signal levels of the corresponding primary colors, and of gray scale images acquired by sequentially changing input signal levels of the corresponding primary colors;

an image capturing section which includes filters having bands for the corresponding primary colors and a through-hole, said filters being designed for allowing transmission of a luminescence band ranges of a corresponding primary color and transmission of at least part of luminescence band ranges of the other primary colors, said image capturing section being for simultaneously capturing said calibration patterns displayed at said image display section, through said filters; and an image correction data calculating section for calculating an offset correction data based on multiband offset captured data acquired by capturing said offset image with said image capturing section, multiband primary color captured data acquired by capturing said primary color images, and primary color scale captured data acquired by capturing said primary color scale images.

11. The correction data acquisition method according to claim 2, wherein, upon capturing for acquisition of said multiband offset captured data, said multiband primary color captured data and said primary color scale captured data, capturing of lights within a wavelength range above 650-780 nm is cut off.

12. The correction data acquisition method according to claim 2, wherein, upon capturing for acquisition of said multiband offset captured data, said multiband primary color captured data and said primary color scale captured data, capturing of lights within a wavelength range below 400 nm is cut off.

13. The correction data acquisition method according to claim 2, wherein the number of said primary colors is not less than three.

14. The correction data acquisition method according to claim 2, wherein said image display section includes a plurality of projectors for projecting and displaying one image.

15. The correction data acquisition method according to claim 2, wherein said filters are designed so as to allow transmission of a luminescence band ranges of a corresponding primary color and transmission of at least part of luminescence band ranges of the other primary colors.

* * * * *